US012703506B2

(12) United States Patent
Mathew et al.

(10) Patent No.: US 12,703,506 B2
(45) **Date of Patent: *Aug. 11, 2026**

(54) MASTLESS AERIAL LIGHTING SYSTEM

(71) Applicant: STL Innovation LLC, Jersey City, NJ (US)

(72) Inventors: John K. Mathew, Emerson, NJ (US); Benny Joseph, Jersey City, NJ (US)

(73) Assignee: STL Innovation LLC, Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/228,915

(22) Filed: Jun. 5, 2025

(65) Prior Publication Data

US 2025/0296700 A1 Sep. 25, 2025

Related U.S. Application Data

(63) Continuation of application No. 18/428,663, filed on Jan. 31, 2024, now Pat. No. 12,358,643.

(Continued)

(51) Int. Cl.

*B64D 47/04* (2006.01)
*B64U 10/14* (2023.01)

(Continued)

(52) U.S. Cl.

CPC ............. *B64D 47/04* (2013.01); *B64U 10/60* (2023.01); *B64U 80/20* (2023.01); *B64U 80/30* (2023.01);

(Continued)

(58) Field of Classification Search

CPC .... B64D 47/04; B64D 2203/00; B64U 10/14; B64U 10/60; B64U 80/20; B64U 80/30;

(Continued)

(56) References Cited

U.S. PATENT DOCUMENTS

| | | | | |
|---|---|---|---|---|
| 9,800,091 | B2 * | 10/2017 | Nugent, Jr | H02J 50/402 |
| 10,011,352 | B1 * | 7/2018 | Dahlstrom | B05B 13/005 |

(Continued)

FOREIGN PATENT DOCUMENTS

| | | | | |
|---|---|---|---|---|
| JP | 2020131960 A * | 8/2020 | | B64U 10/13 |
| KR | 1627347 B1 * | 6/2016 | | |
| KR | 20230040440 A * | 3/2023 | | B64U 50/19 |

*Primary Examiner* — Joshua E Rodden

(74) *Attorney, Agent, or Firm* — Meunier Carlin & Curfman LLC

(57) ABSTRACT

An aerial lighting system includes: two or more unmanned aerial vehicles (UAVs) each including a corresponding high-powered LED array arranged to illuminate an area beneath the UAVs when the UAVs are airborne; a base station configured to retain the UAVs when not airborne, wherein the base station includes a controller for controlling the UAVs; and a plurality of cables for transferring power and data, including: (i) a first cable detachably coupled between the base station and a first UAV, wherein the first UAV receives power from the base station and communicates with the controller via the first cable, and (ii) a second cable detachably coupled between the first UAV and a second UAV, wherein the second UAV receives power from the base station and communicates with the controller via the second cable.

19 Claims, 21 Drawing Sheets

Related U.S. Application Data

(60) Provisional application No. 63/482,515, filed on Jan. 31, 2023.

(51) Int. Cl.

| | |
|---|---|
| ***B64U 10/60*** | (2023.01) |
| ***B64U 80/20*** | (2023.01) |
| ***B64U 80/30*** | (2023.01) |
| ***H01B 7/282*** | (2006.01) |
| ***H01B 11/00*** | (2006.01) |
| *B64U 101/00* | (2023.01) |

(52) U.S. Cl.
CPC ........... *H01B 7/282* (2013.01); *H01B 11/002* (2013.01); *B64D 2203/00* (2013.01); *B64U 10/14* (2023.01); *B64U 2101/00* (2023.01); *B64U 2201/202* (2023.01)

(58) Field of Classification Search
CPC ............ B64U 2101/00; B64U 2201/20; B64U 2201/202; G05D 1/678; H01B 7/282; H01B 11/002
USPC ....................................................... 244/114 R
See application file for complete search history.

(56) References Cited

U.S. PATENT DOCUMENTS

| | | | | |
|---|---|---|---|---|
| 10,498,566 | B2 * | 12/2019 | Kennedy | H04L 25/26 |
| 11,325,702 | B2 * | 5/2022 | Zawadzki | G05D 1/104 |
| 11,548,632 | B2 * | 1/2023 | Hiller | B64D 47/02 |
| 12,239,863 | B2 * | 3/2025 | Suefuku | B08B 3/024 |
| 12,358,643 | B2 * | 7/2025 | Mathew | H01B 11/002 |
| 2016/0144958 | A1 * | 5/2016 | Woodworth | G05D 1/0866<br>244/139 |
| 2016/0318607 | A1 * | 11/2016 | Desai | A01M 7/00 |
| 2017/0031365 | A1 * | 2/2017 | Sugumaran | G05D 1/0219 |
| 2017/0247108 | A1 * | 8/2017 | Ljubuncic | G06V 20/17 |
| 2018/0086460 | A1 * | 3/2018 | Beaman | B64U 30/20 |
| 2019/0100305 | A1 * | 4/2019 | Patten | F03D 5/00 |
| 2019/0256207 | A1 * | 8/2019 | Nohmi | G05D 1/0866 |
| 2021/0009283 | A1 * | 1/2021 | Pawliczek | B64D 47/06 |
| 2021/0300557 | A1 * | 9/2021 | Oshima | B64F 3/00 |
| 2021/0316858 | A1 * | 10/2021 | Pargoe | B64U 10/14 |
| 2021/0341128 | A1 * | 11/2021 | Abron | G09F 19/12 |
| 2022/0236745 | A1 * | 7/2022 | Fagiano | G05D 1/085 |
| 2022/0250768 | A1 * | 8/2022 | Oshima | B61B 13/00 |
| 2024/0286773 | A1 * | 8/2024 | Humann | B64U 10/60 |
| 2025/0319998 | A1 * | 10/2025 | Ishikawa | G01S 17/933 |
| 2025/0368360 | A1 * | 12/2025 | Knopf | B64U 10/13 |

* cited by examiner

MASTLESS AERIAL LIGHTING SYSTEM

CROSS-REFERENCE TO RELATED APPLICATIONS

This application is a continuation of U.S. patent application Ser. No. 18/428,663, filed Jan. 31, 2024, and claims priority to and the benefit of U.S. Provisional Patent Application No. 63/482,515, filed Jan. 31, 2023, which is incorporated herein by reference in its entirety.

BACKGROUND

On-premise and/or on-demand lighting solutions are systems that can be deployed to an area for temporary or semi-permanent lighting. On-premise and/or on-demand lighting solutions can be found across a range of industries and use cases. For example, on-premise and/or on-demand lighting is common in industries such as construction, where crews may deploy light towers or other types of area lighting solutions to provide adequate light for working in the evenings or at night. As another example, emergency response personnel may deploy on-premise and/or on-demand lighting to illuminate the scene of an accident or emergency. However, current on-premise and/or on-demand lighting solutions are often expensive to buy, rent, and maintain, and can be quite complex to set up and use. In addition, some existing on-premise and/or on-demand lighting solutions can be unsafe to use, e.g., in certain conditions or for non-expert users.

As an example, some existing on-premise and/or on-demand lighting solutions require complex and costly installation processes, such as digging trenches to place and secure wiring or installing overhead wiring that is vulnerable to the elements and susceptible to damage. These installation processes can also pose a large risk of damaging existing infrastructure, such as gas lines and sewers. In addition, some solutions may require the use of transformers or generators, which can be cumbersome and difficult to transport. For example, in emergencies, setting up existing on-premise and/or on-demand lighting solutions can waste precious time. Other solutions may rely on the use of masts, poles, tripods, or makeshift stands in varying locations, which can be time-consuming and labor-intensive to set up. Many current solutions require manual intervention and control, which can be inconvenient and inefficient. In some cases, an area may not be suitable for large deployments requiring additional structures such as concrete slabs or foundations, further limiting the options for on-demand lighting. As a result, it can be prohibitively difficult and costly to quickly and safely light a wide area on demand using currently available solutions.

SUMMARY

One implementation of the present disclosure is a lighting system including: two or more unmanned aerial vehicles (UAVs), including: (i) a first UAV including a first high-powered light emitting diode (LED) array arranged to illuminate an area beneath the first UAV when the first UAV is airborne, and (ii) a second UAV including a second high-powered LED array arranged to illuminate an area beneath the second UAV when the second UAV is airborne; a base station configured to retain the first UAV and the second UAV when not airborne, wherein the base station includes a controller for controlling the first UAV and the second UAV; and a plurality of cables for transferring power and data, including: (i) a first cable detachably coupled between the base station and the first UAV, wherein the first UAV receives power from the base station and communicates with the controller via the first cable, and (ii) a second cable detachably coupled between the first UAV and the second UAV, wherein the second UAV receives power from the base station and communicates with the controller via the second cable.

In some implementations, each cable the plurality of cables includes: a plurality of first conductors for transferring data; a pair of second conductors for transferring direct current (DC) power, wherein the plurality of first conductors are separated from the pair of second conductors by at least one of a first insulating layer or a first shielding layer; and an outer sheath formed of a weatherproof material, wherein the outer sheath covers the pair of first conductors, wherein the pair of second conductors are separated from the outer sheath by at least one of a second insulating layer or a second shielding layer.

In some implementations, each cable the plurality of cables includes: a pair of connectors, including a first connector disposed on a first end the cable and a second connector disposed on a second end the cable, wherein the pair of connectors are conical in shape and each include a magnetically conductive portion that attaches to one of the two or more UAVs or the base station via an electromagnetic connection.

In some implementations, each connector of the pair of connectors includes a passive identification tag that identifies the connector and the cable.

In some implementations, an identifier obtained from the passive identification tag is communicated to the controller such that the controller can detect a configuration of the plurality of cables and the two or more UAVs.

In some implementations, each cable the plurality of cables includes: a plurality of first conductors for transferring data; a pair of second conductors for transferring direct current (DC) power, wherein the plurality of first conductors and the pair of second conductors terminate in circular or annular-shaped interfaces within the pair of connectors.

In some implementations, the base station includes a power storage element for providing power to the two or more UAVs.

In some implementations, the base station includes a power cable for selectively coupling the base station to a power source for providing power to the two or more UAVs.

In some implementations, the base station includes a user interface for indicating information associated with the two or more UAVs, wherein the user interface is communicably coupled to the controller.

In some implementations the controller includes a wireless interface for wirelessly communicating with a remote computing device, and wherein the controller is configured to receive configuration data and commands from the remote computing device for controlling the two or more UAVs.

In some implementations, the two or more UAVs are configured to be arranged in a stack when retained by the base station, wherein each of the two or more UAVs includes alignment elements that are configured to interface with corresponding alignment elements of another of the two or more UAVs for alignment of the two or more UAVs in the stack.

In some implementations, the alignment elements of each UAV of the two or more UAVs include: a set of protrusions formed on a first side of the UAV; and a set of indentations formed on a second side of the UAV opposite the first.

In some implementations, the base station includes alignment elements that are configured to interface with the alignment elements of the first UAV.

In some implementations the base station includes at least one cable management element for retaining the plurality of cables when the two or more UAVs are arranged in the stack, wherein the at least one cable management element including a pole that extends vertically from a base portion of the base station, wherein the plurality of cables are retained by being wound about the at least one cable management element.

In some implementations, the controller is configured to execute a recall operation by communicating with each of the two or more UAVS, wherein the recall operation includes causing each UAV of the two or more UAVs to return to the base station and perform a first series of maneuvers to wind a corresponding one of the plurality of cables around the at least one cable management element.

In some implementations, the controller is configured to: obtain configuration data for the two or more UAVs, wherein the configuration data includes a desired arrangement of the two or more UAVs in a first area; and control the two or more UAVs according to the configuration data, including to: (i) selectively activate the two or more UAVs according to their arrangement in a stack on the base station, and (ii) cause the two or more UAVs to maneuver from the base station to an aerial position in the first area.

In some implementations, each of the first high-powered LED array and the second high-powered LED array includes one of: (i) a plurality of LEDs arranged in a grid, or (ii) a plurality of LEDs arranged into strips, and wherein each of the first high-powered LED array and the second high-powered LED array is disposed on a bottom side of a respective one of the first UAV or the second UAV such that a majority of light emitted by the first high-powered LED array or the second high-powered LED array projects downward from the respective one of the first UAV or the second UAV.

In some implementations, each UAV the two or more UAVs includes an on-board controller, a sensor array, and an on-board power supply, and wherein each UAV of the two or more UAVs is configured to execute a recovery operation in the event that a corresponding one of the plurality of cables is disconnected, the recovery operation including to: determine a position of a connector at an end of the disconnected cable based on at least one of data from the sensor array or wireless communications from another one of the two or more UAVs; maneuver such that a connection point on the UAV is within a threshold distance of the position of the connector; and activate an electromagnet in the connection point to reattach the cable to the UAV while simultaneously making adjustments to a position of the UAV to align the connector with the connection point.

In some implementations, the first cable is longer than any other cables of the plurality of cables, including the second cable.

In some implementations the two or more UAVs are quadcopters.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

FIGS. 5A-5E are diagrams illustrating a recovery operation for reconnecting a UAV to a corresponding cable, according to some implementations.

Figure 1:
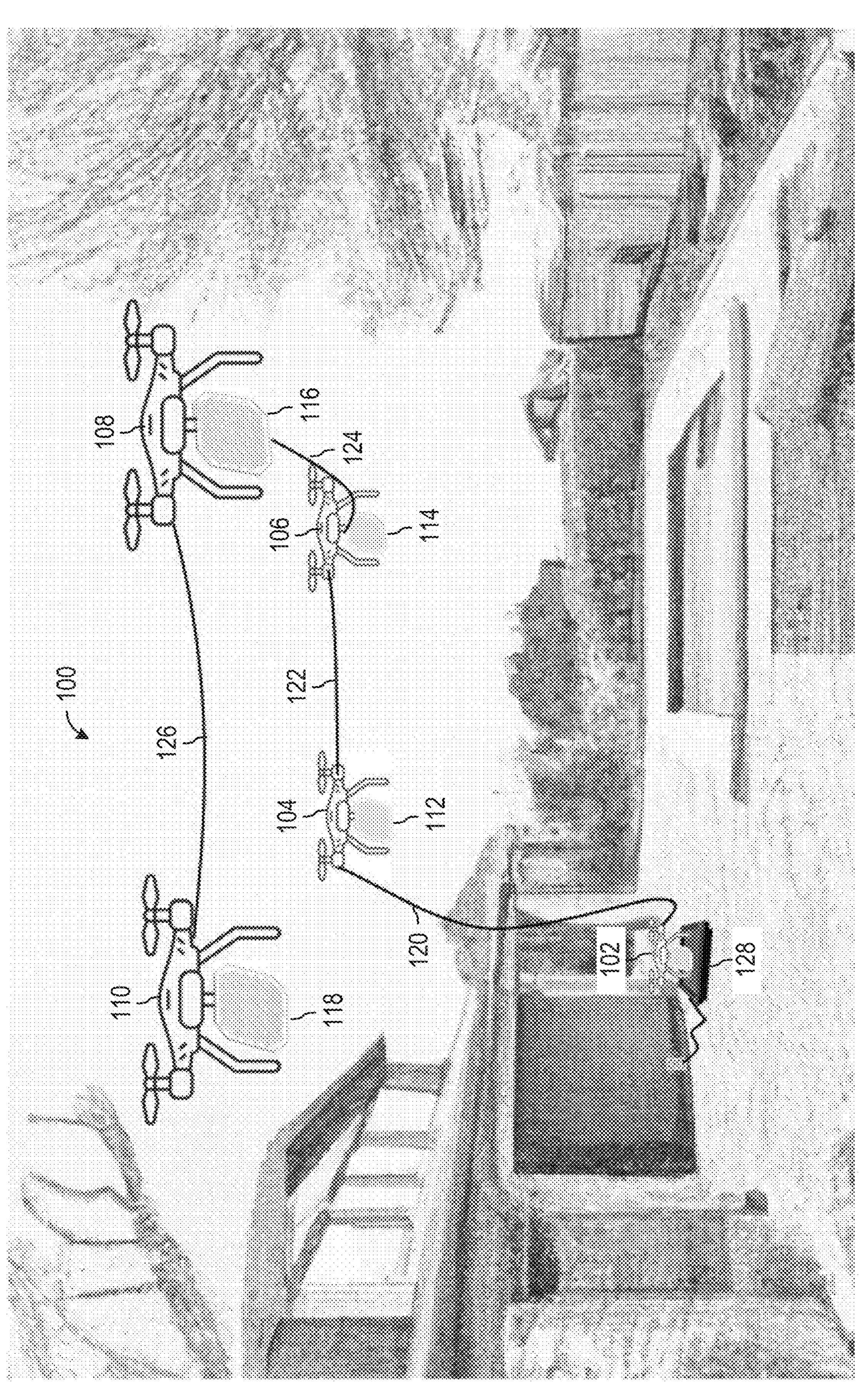
FIG. 1 is a diagram of an aerial lighting system, according to some implementations.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the figures, a "mastless" aerial lighting system is shown, according to various implementations. As used herein, "mastless" refers to a lighting system that does not include masts, poles, tripods, or the like, as commonly found in existing on-premise and/or on-demand lighting solutions. "Aerial" refers to a lighting system wherein the lighting elements (e.g., lights, light panels, lighting array, etc.) are positioned in the air without the use of a support structure—in other words, airborne—when in operation. In this regard, the "mastless" aerial lighting system—or simply "aerial lighting system"—disclosed herein generally includes a plurality of unmanned aerial vehicles (UAVs) or "drones" having lights arranged thereon for illuminating an area when the UAVs are airborne.

The use of UAVs to carry lighting elements (e.g., light-emitting diode (LED) arrays) eliminates the need for bulky and cumbersome mounting systems (e.g., masts, poles, etc.) allowing for greater portability. As discussed below, the disclosed aerial lighting system is also much easier to set up when compared to existing lighting solutions, especially for non-expert users, and can be significantly cheaper to produce and operate. For example, the disclosed aerial lighting system can be autonomously or semi-autonomously deployed (e.g., with a simple "deploy" command via a user interface), thereby requiring only minimal user interaction for set-up. The disclosed aerial lighting system therefore provides users with a quick and efficient lighting solution for illuminating any size area in a matter of minutes. Among other features, the disclosed aerial lighting system addresses the problem of providing powerful, on-demand lighting, e.g., for personal or commercial use, without the cost, complexity, and infrastructure required for existing lighting solutions.

It should be appreciated that the disclosed aerial lighting system can be used across a variety of industries and in a variety of use cases including, but not limited to, construction and roadwork sites, emergency services (e.g., search and rescue operations, environmental disaster response and clean-up, etc.), security, recreation (e.g., outdoor concerts, sporting events, etc.), video production, and so on. Unlike current area lighting solutions, for example, the disclosed aerial lighting system is easier and more economical to operate, making it a better option for various use cases (e.g., outdoor recreation) where the cost, complexity, and infrastructure of existing lighting solutions are prohibitive, as mentioned above. The disclosed aerial lighting system is also more environmentally friendly, not necessarily requiring the use of a fossil-fuel-powered generator or the distribution of an environment (e.g., ground, trees, etc.) for deployment. Additional features and benefits are described in greater detail below.

Overview

Turning first to FIG. 1, a diagram of an aerial lighting system 100 is shown in a first example arrangement, according to some implementations. Specifically, in this example, aerial lighting system 100 is shown in a deployed state in a residential environment (e.g., a backyard) but, as discussed above, this example is not intended to be limiting. Rather, aerial lighting system 100 can be deployed in a wide variety of different environments and for a wide variety of use cases. Regardless, the general configuration of aerial lighting system 100 may be similar across use cases, with certain possible variations as discussed below.

Aerial lighting system 100 is shown to include a plurality of unmanned aerial vehicles (UAVs)—alternatively referred to as "drones"—labeled as UAVs 102-108. In the illustrated example, UAVs 102-108 are multi-copters or "multirotor" aerial vehicles, which are known to those in the art as aerial rotorcraft that use two or more rotors to generate lift. In some implementations, as discussed below with respect to FIGS. 3A-3C, UAVs 102-108 may specifically be quadcopters, which include four rotors; however, the present disclosure is not intended to be limiting in this regard. For example, other configurations are contemplated in which UAVs 102-108 are tricopters, hexacopters, octocopters, etc. Further, in certain other implementations, UAVs 102-108 may take the form of another type of unmanned aerial vehicle.

Each of UAVs 102-108 is shown to include or carry a corresponding light panel or lighting array—labeled as lighting arrays 112-118—that, when activated, emit light to illuminate an area (e.g., a backyard, in the example shown). As discussed below, lighting arrays 112-118 may generally be arranged such that a majority (e.g., more than half) of the light emitted thereby is directed downward, e.g., from a bottom of a corresponding one of UAVs 102-108; however, some of the light emitted by one or more of lighting arrays 112-118 may be directed to at least one side of a corresponding one of UAVs 102-108. In some implementations, lighting arrays 112-118 are fixedly coupled to UAVs 102-108 and therefore may only emit light in a direction away from their mounting position. In other implementations, lighting arrays 112-118 are movably coupled to UAVs 102-108 such that the direction in which light is emitted can be adjusted. Additional details are provided below with respect to FIG. 3C.

Aerial lighting system 100 is further shown to include a plurality of cables 120-126 connected between respective ones of UAVs 102-108. While not shown, a cable similar to cables 120-126 can be connected between a base station 128 (described below) and a first one of the UAVs (e.g., UAV 102). In some implementations, the first cable that connects UAV 102 to base station 128 is longer than any of the other cables (e.g., cables 120-126) so that UAV 102 may be positioned sufficiently far from base station 128 to operate. Cables 120-126, as described in greater detail below with respect to FIGS. 4A-4D, are configured to transfer power and data between UAVs 102-108 and/or between base station 128 and each of UAVs 102-108. In particular, cables 120-126 each include a first set of conductors for transferring power to UAVs 102-108 from base station 128 and a second set of conductors or other data transmission elements (e.g., optical fiber(s)) for communicating data between base station 128 and UAVs 102-108. In some implementations, power and/or data is transferred directed to each of UAVs 102-108 from base station 128. In other implementations, power and/or data from base station 128 is routed through each of UAVs 102-108, and/or a connector thereof, in succession.

Base station 128, described below with respect to FIGS. 7A-8 in greater detail, is accordingly configured to provide power to UAVs 102-108 and to coordinate operations of UAVs 102-108, e.g., by sending commands. Base station 128 generally includes a control system, or simply "controller," for controlling UAVs 102-108, a power supply for providing power to UAVs 102-108, and optionally a user interface so that a user can interact with aerial lighting system 100. However, as discussed below, base station 128 can also include wired or wireless communication abilities to allow users to interact with aerial lighting system 100 via a separate device. As shown, the power supplied to UAVs 102-108 via base station 128 may be provided by an external power source, such as a wall outlet, a generator, a solar panel, an external battery, etc. Additionally, or alternatively, base station 128 may include an on-board power source, such as a battery or generator.

As described herein, aerial lighting system 100 is generally considered a "tethered" system since power and data are provided to UAVs 102-108 via cables 120-126 from base station 128. By tethering to base station 128, an effectively unlimited amount of power can be supplied to UAVs 102-108, e.g., to sustain prolonged operations. For example, untethered UAVs would need to rely solely on an onboard power supply to not only stay airborne but, if used for lighting as in the context of UAVs 102-108, to operate a lighting array. As will be appreciated, the type of high-powered lighting arrays needed to illuminate an outdoor area can use significant amounts of power, which would rapidly deplete the batteries of most UAVs or drones. While battery capacity could be increased to accommodate a high-powered lighting array, an increase in battery capacity comes with a necessary increase in battery size and weight, which can severely impact the performance of a UAV and/or further increase the energy expenditure required to operate rotors to keep the UAV airborne—offsetting the increase in battery capacity with respect to operating time.

Additionally, the arrangement of UAVs 102-108 can be described as a "network," since UAVs 102-108 are connected via cables 120-126 into a system. This arrangement can increase the size of an area that can be covered (e.g., illuminated) by aerial lighting system 100, since the distance each of UAVs 102-108 traverse from base station 128 is not limited solely to the length of one cable, e.g., which would be the case if each of UAVs 102-108 was individually connected to base station 128 by a respective cable. Instead, the distance each respective one of UAVs 102-108 can traverse from base station 128 is based on the combined length of each preceding cable. For example, in the arrangement shown in FIG. 1, UAV 104 may only extend from base station 128 by a distance equal to the length of cable 120; however, UAV 110 may extend from base station 128 by a distance equal to the combined length of cables 120-126.

Figures 2A, 2B:
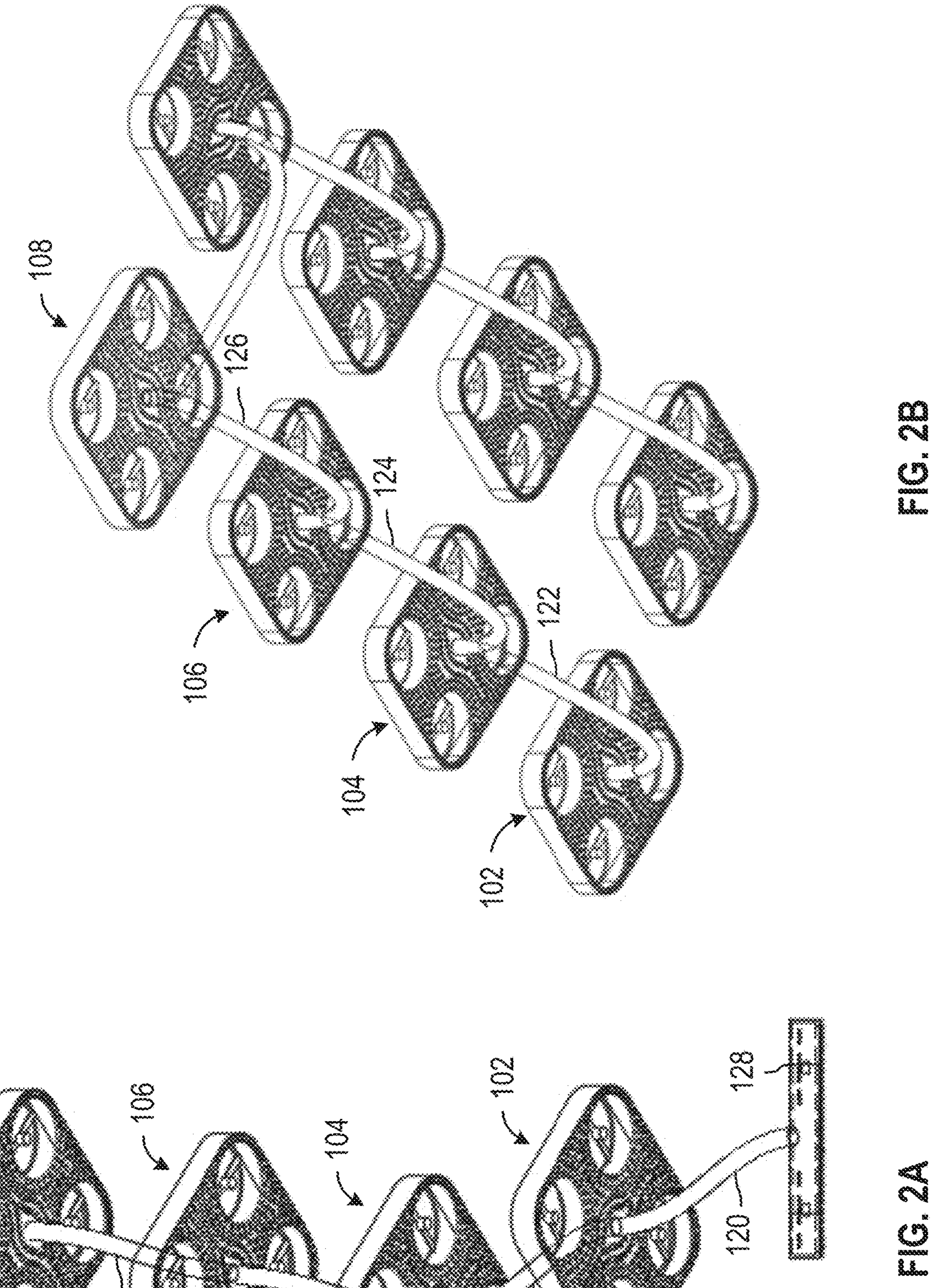
FIG. 2A is a diagram of a first arrangement of unmanned aerial vehicles (UAVs) in the aerial lighting system described herein, according to some implementations.
FIG. 2B is a diagram of a second arrangement of UAVs in the aerial lighting system described herein, according to some implementations.
Figure 2C:
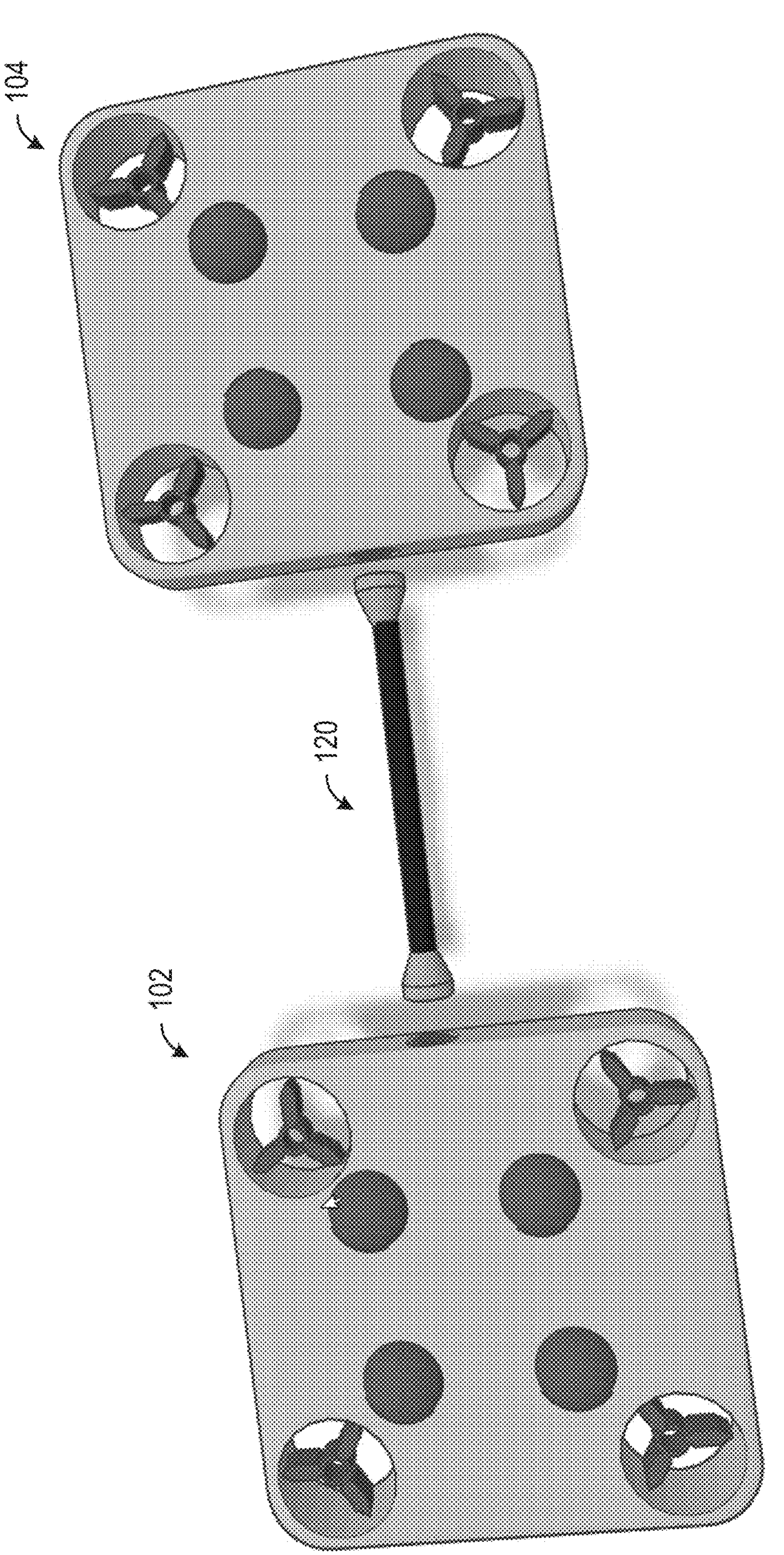
FIG. 2C is a diagram of a connection between two UAVs, according to some implementations.

Example arrangements of UAVs 102-108 are further illustrated in FIGS. 2A and 2B. FIG. 2A, in particular, illustrates a first arrangement of UAVs 102-108 in which cables 120-126 are coupled on different sides of each respective UAV; thus, each of UAVs 102-108 is generally positioned on a plane above a preceding UAV. For example, cable 120—which connects UAV 102 to base station 128—is connected on a first (e.g., bottom) size of UAV 102, while cable 122—which connects UAV 102 to UAV 104—is connected on a second (e.g., top) size of UAV 102. FIG. 2B shows a second arrangement of UAVs 102-108 in which cables 120-126 are connected on the same side of respective ones of UAVs 102-108. For example, cable 122 and cable 124 are both connected on a first (e.g., bottom) size of UAV 104. It should be appreciated, however, that these two arrangements are provided as illustrative examples only and are not intended to be limiting. Other arrangements of UAVs 102-108 and/or cables 120-126 are contemplated herein. FIG. 2C illustrates a connection between two of UAVs 102-108 via one of cables 120-126. Specifically, UAVs 102 and 104 are shown to be connected via cable 120. Additional details of the connection between UAVs 102-108, and the arrangement of cables 120-126, are provided below with respect to FIGS. 4A-4F.

Example UAV

Figure 3A:
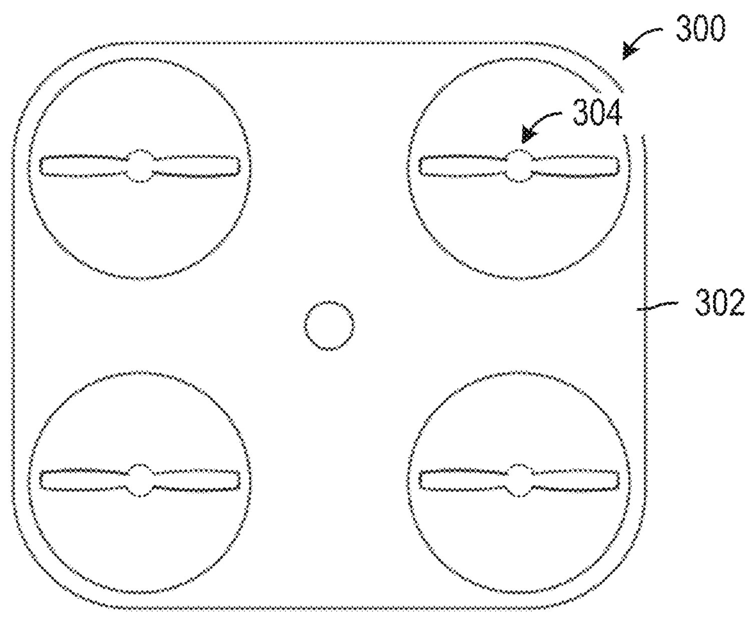
FIGS. 3A-3C are diagrams of an example UAV for use in the aerial lighting system described herein, according to some implementations.
Figure 3B:
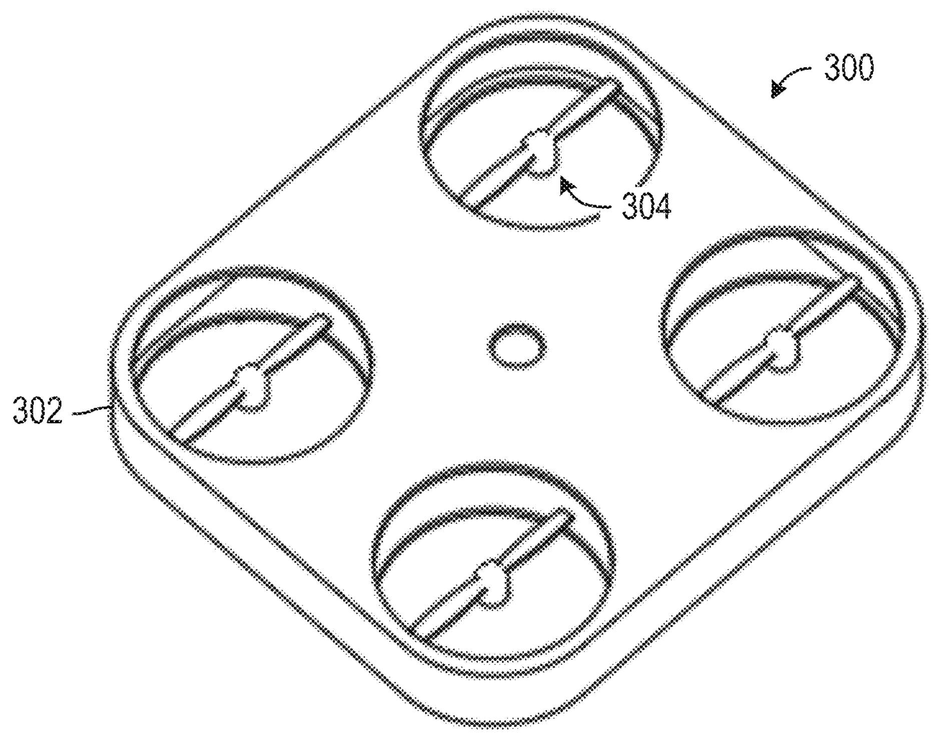
Figure 3C:
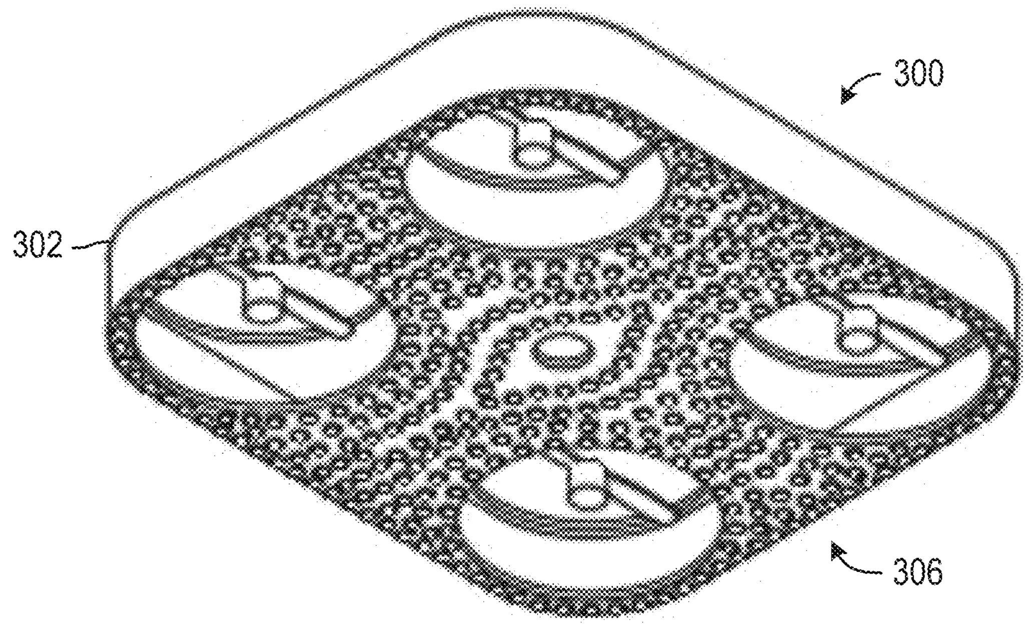

Referring now to FIGS. 3A-3C, an example UAV 300 is shown from various perspectives, according to some implementations. As described herein, UAV 300 is one configuration or "style" of UAV that can be used in aerial lighting system 100. In other words, UAVs 102-106 may be, or may be substantially similar to, UAV 300. UAV 300 is shown to include a body 302 and a plurality of rotors 304; hence, UAV 300 is generally referred to as a "multi-copter." In the specific arrangement shown, UAV 300 includes four of rotors 304 and therefore can be considered a quadcopter. However, as discussed and, the present disclosure is not intended to be limiting in this regard. For example, other configurations are contemplated in which UAV 300 includes three, six, eight, or more of rotors 304.

In the example shown, body 302 of UAV 300 is generally square or rectangular in shape (e.g., with rounded corners). However, the present disclosure is also not intended to be limiting in this regard. For example, body 302 may be any shape suitable to support rotors 304 and the other components of UAV 300 described herein. While rotors 304 are shown as being situated within body 302, it should also be appreciated that other configurations are contemplated in which rotors 304 are positioned away from and/or are distinct from body 302. For example, rotors 304 may be attached to body 302 via arms. Also, while not illustrated, it should be appreciated that rotors 304 may each be attached to, and thereby rotated by, a corresponding motor.

UAV 300 can further include a lighting array 306 positioned on or coupled to body 302. As shown in FIG. 3C, in some implementations, lighting array 306 is an arrangement of lights (e.g., LEDs) attached to a bottom side of body 302. For example, lighting array 306 may include an LED panel (e.g., as in FIG. 1), a plurality of LED strips (e.g., as in FIG. 6A), or an arrangement (e.g., a grid) of individual LEDs mounted on the bottom of body 302 (e.g., as in FIG. 3C). In some such implementations, lighting array 306 may be positioned directly on body 302 or components thereof (e.g., lighting array 306 may include LEDs positioned on arms that connect rotors 304 to body 302). In other implementations, lighting array 306 includes an LED panel or other similar light-emitting panel mounted to UAV 300, e.g., through a coupling or mounting element, or at a different position than what is illustrated in FIG. 3C. For example, in FIG. 1, each of UAVs 102-108 are shown to carry an LED panel (e.g., lighting arrays 112-118) via a mounting element that is attached to a bottom side of the UAV. It should therefore be appreciated that the specific arrangement and attachment mechanism for lighting array 306 is not intended to be limiting. For example, UAV 300 may be equipped with LED lights on its frame or can carry LED panels of different shapes and sizes.

As described in greater detail below, UAV 300 generally includes—e.g., contained within body 302—onboard processing components (e.g., a controller, sensors, etc.) that facilitate flight operations, including self-orientation and positioning (e.g., through a receiver and beacon). In some implementations, UAV 300 includes an onboard power supply (e.g., a battery) and has the ability to switch to the onboard power supply and execute return functions when power from a base station (e.g., base station 128) is lost (e.g., due to a corresponding power and data cable being disconnected or failing). As also described in greater detail below, UAV 300 can include an interface for coupling with any of cables 120-126, e.g., to connect to other UAVs or base station 128. In some implementations, UAV 300 utilizes various sensors (e.g., cameras, proximity sensors, IR sensors, etc.) and corresponding software to identify base station 128 and other UAVs and can even collect data for machine learning models, e.g., to improve various aspects of its performance. When in operation, UAV 300 is able to adjust its distance, e.g., from base station 128 and other UAVS, and maintain a deployed layout—taking into account terrain and weather factors that may displace it and return to an original (e.g., pre-deployment) position in an organized manner alongside other deployed UAVs.

Power and Data Cables

Figure 4B:
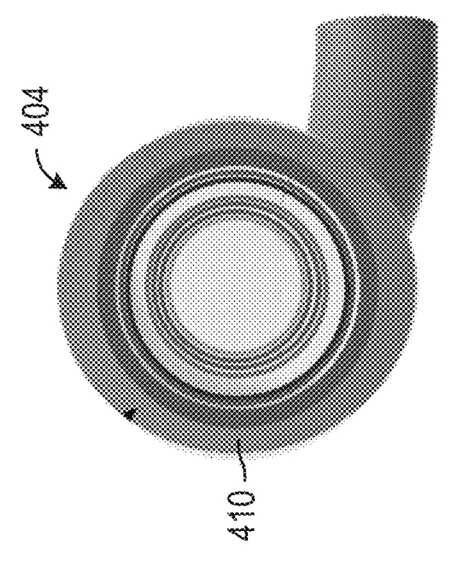
FIGS. 4A-4D are diagrams of a cable for tethering two or more UAVs together and/or to a base station, according to some implementations.
Figure 4A:
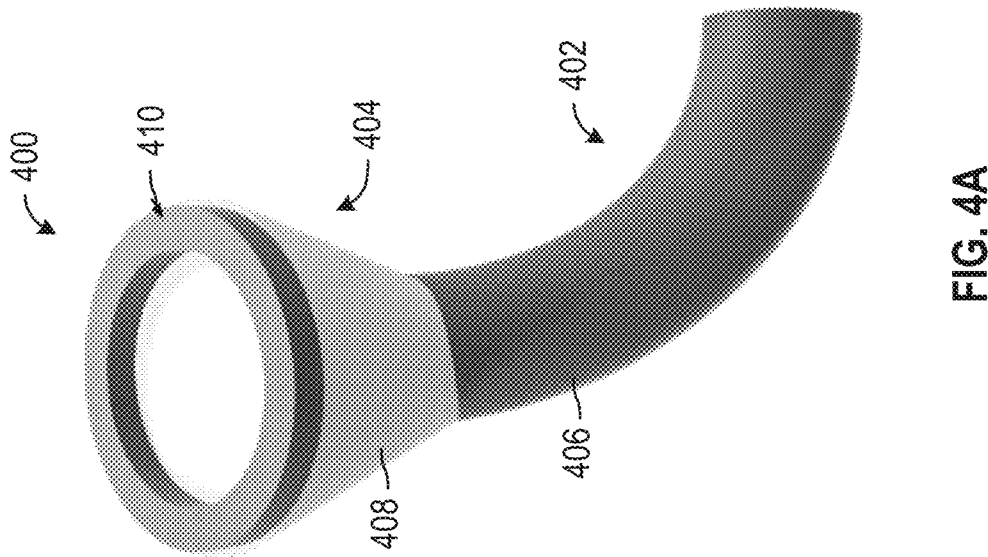
Figure 4C:
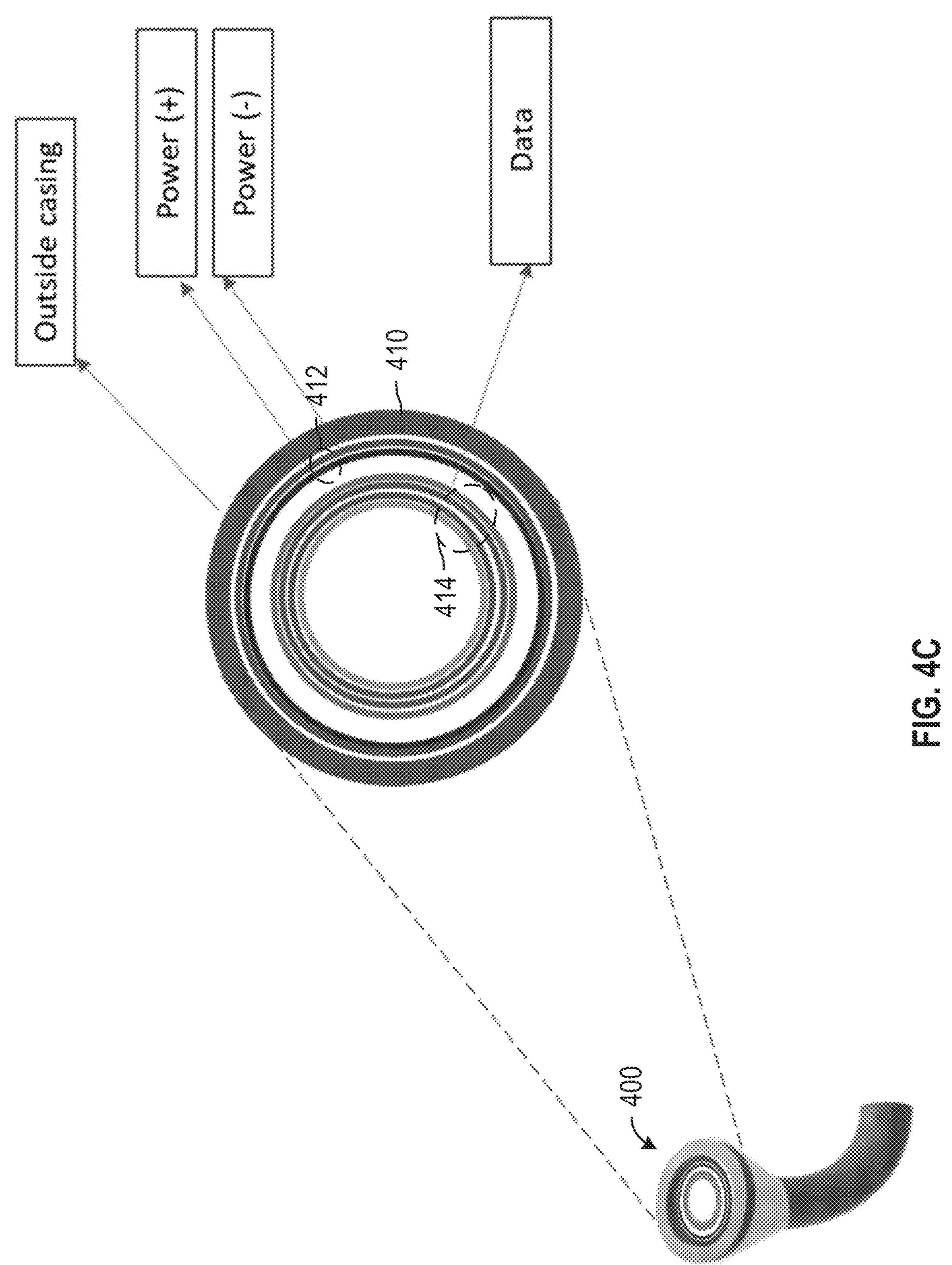

Referring now to FIGS. 4A-4D, a cable 400 for tethering two or more UAVs (e.g., UAVs 102-108) together and/or to a base station (e.g., base station 128) is shown from various perspectives, according to some implementations. As described above with respect to cables 120-126—each of which may be the same as cable 400—cable 400 designed for both power transfer and data communications. Specifically, as shown in FIG. 4C, cable 400 can include both a set of conductors 412 for the transfer of DC power and data transmission elements 414 for the transfer of data, e.g., in the form of electrical or optical pulses, waveforms, etc. Additional details of conductors 412 and data transmission elements 414 are discussed below. Additionally, while not shown, it should be appreciated that cable 400 may include additional LEDs or other lighting elements arranged thereon to supplement the light emitted by lighting arrays 112-118.

First, with reference to FIGS. 4A and 4B in particular, one end of cable 400 is illustrated; although, it will be appreciated that the second, non-illustrated end of cable 400 generally mirrors the end shown in the figures. Regardless, cable 400 is shown to include a body portion 402 terminated, on both ends, with a connector 404. Body portion 402 is generally a flexible, multi-layer cable through which conductors 412 and data transmission elements 414 extend. In some implementations, as described below with respect to FIG. 4D, conductors 412 and/or data transmission elements 414 each include discrete shielding and/or insulting layers to prevent signal leakage/interference. Shielding layers can, for example, be or include wrapped foil or braided wire mesh. Insulating layers may be formed of any suitable insulating material(s), such as a dielectric.

Generally, cable 400 is designed to be used in a variety of environments and weather conditions. Therefore, body portion 402 of cable 400 may include a weatherproof outer jacket 406. In some implementations, weatherproof outer jacket 406 is formed of a TPE thermoplastic elastomer that also provides abrasion resistance while maintaining flexibility; however, the specific materials used in weatherproof outer jacket 406 are not intended to be limiting. For example, weatherproof outer jacket 406 may alternatively be formed of polyurethane, rubber, or another suitable material. Notably, weatherproof outer jacket 406 may be formed of a material or combination of materials that is sufficiently UV resistant to limit UV degradation.

The materials and components used to form cable 400 may generally be selected to operate across a range of temperature conditions, such as from −20° C. to 50° C. Cable 400 is also flexible and self-straightening. For example, weatherproof outer jacket 406 is generally formed of a material that allows for flexibility while the internal components of cable 400 (discussed below) support dynamic bending without breakage. In some implementations, cable 400 includes an integrated spring-tempered member (not shown) that applies longitudinal straightening force so cable 400 untangles itself when uncoiled. In some implementations, cable 400 includes an aramid fiber braided layer (e.g., Kevlar) to provide tensile reinforcement for emergency breakaway and self-straightening without adding excessive weight. In some implementations, cable 400 is designed to meet flammability standards for aerospace components, e.g., to reduce fire risk combined with high electrical loads. Additionally, it should be appreciated that the weight of cable 400, e.g., per unit length, is equal to or less than a payload of each of UAVs 102-108.

Connector 404, as mentioned, is configured to electronically and communicably couple conductors 412 and data transmission elements 414 to one of UAVs 102-108 (e.g., UAV 300) or base station 128. Accordingly, connector 404 may be designed to interface with a connection point 430 on any of UAVs 102-108 or base station 128, as described below with respect to FIGS. 4E and 4F. Connector 404 generally includes a body 408 and a magnetically conductive interface 410. As illustrated, body 408 of connector 404 is generally conical in shape to enable self-alignment with the connection point on a UAV or base station. Specifically, a conical interface geometry allows for a measure of angular misalignment while still enabling a solid and complete connection. However, it should be understood that other shapes/arrangements of connector 404 are contemplated herein for various other use cases (e.g., for different arrangements of the connection point on a UAV or base station). Body 408 is generally fabricated from any suitable material, such as metal or high-strength plastic. For example, in some implementations, body 408 is fabricated from machined aluminum.

Magnetically conductive interface 410 is, per its name, generally formed of a magnetically conductive (e.g., ferrous) material, and is configured to secure connector 404 to connection point 430 on one of UAVs 102-106 or base station 128. In particular, the connection point(s) (e.g., connection point 430) on each of UAVs 102-106 or base station 128 may include an electromagnet that can be selectively activated to couple connector 404 to the connection point. In other words, when the electromagnet of a connection point is energized, and therefore generating a magnetic field, it can attract magnetically conductive interface 410 of connector 404 when connector 404 is in close proximity (e.g., within a threshold distance) to the connection point. The electromagnetic connection between the connection point and magnetically conductive interface 410 therefore maintains the connection between the UAV or base station and cable 400. In turn, the electromagnet in the connection point of the end device (e.g., the UAV or base station) can be deactivated to disconnect cable 400 from the end device.

In some implementations, magnetically conductive interface 410 is generally ring-shaped and covers a face of connector 404, as shown in the figures. In some implementations, magnetically conductive interface 410 has a radial beveled male profile to provide alignment with a female bevel in the connection point on the end device, e.g., when pulled together by the electromagnetic locking mechanism. In some such implementations, magnetically conductive interface 410 may have a generally convex ring-shape to securely align with a generally concave ring-shaped interface in connection point 430, as discussed below. In other implementations, magnetically conductive interface 410 is formed of metallic contact pads embedded within connector 404 or otherwise positioned on a connection face of connector 404, e.g., to minimize weight while permitting electromagnetic interfacing. The conductive composite material selected for magnetically conductive interface 410 permits magnetic attraction to the active electromagnets in the connection point of the end device with an approximately 1-10 lb clamping force when mated securely. It should be appreciated that the electromagnetic attachment force provided by magnetically conductive interface 410 is generally sufficient to enable a solid connection, e.g., when the UAV is in flight, but is calibrated low enough for an intentional emergency breakaway without damage.

Figure 4D:
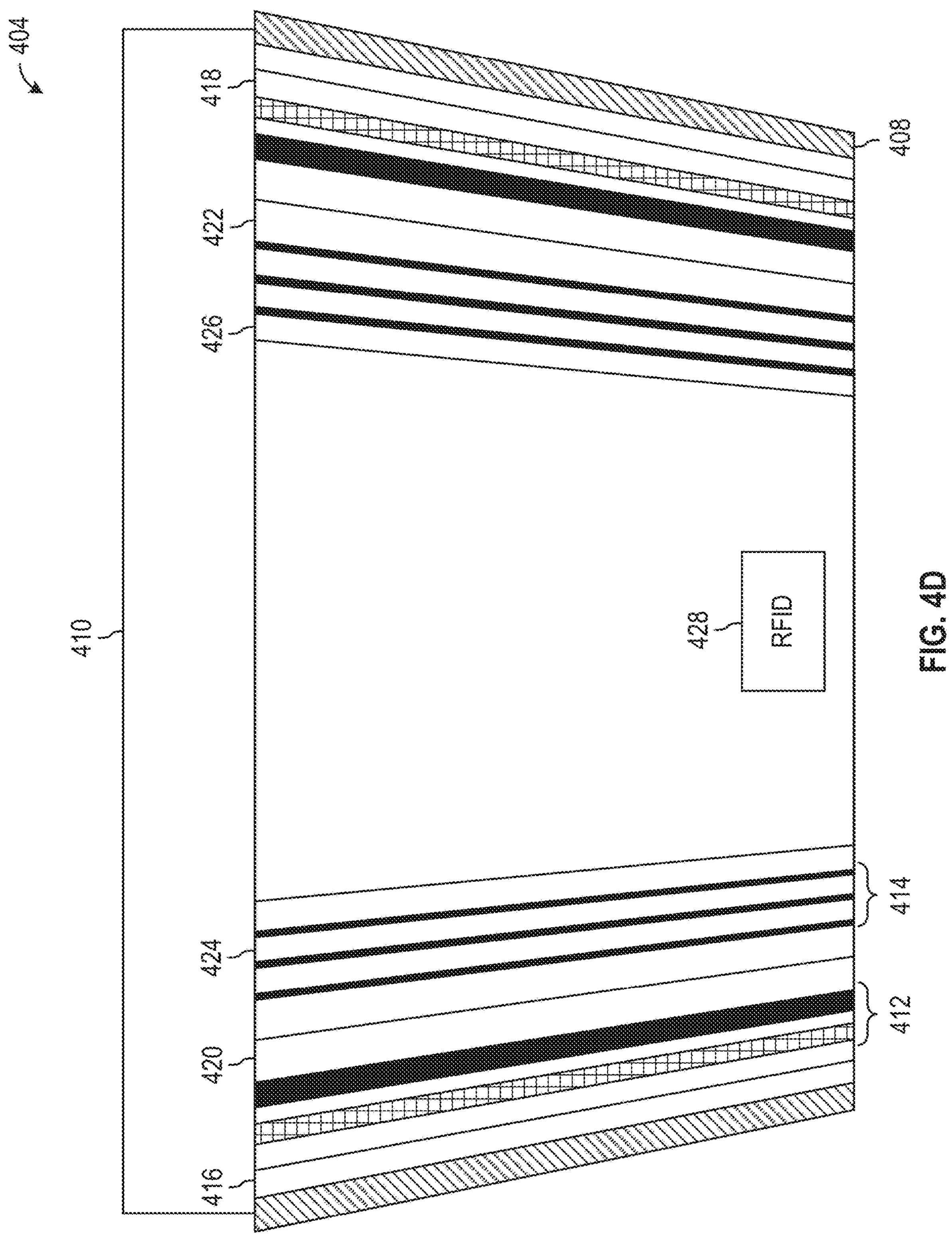

With reference to FIGS. 4C and 4D, in particular, additional features of connector 404, conductors 412, and data transmission elements 414 are shown in greater detail. As mentioned above, conductors 412 and data transmission elements 414 generally extend internal to, and along a length, of body portion 402 of cable 400. In some implementations, conductors 412 include two or more electrically conductive wires, e.g., for transferring DC power. For example, in FIGS. 4C and 4D, conductors 412 includes two conductors—one for power transfer and another to act as a ground. In one example, the conductors of conductors 412 are stranded tin-plated copper cable, which offers durability and high-current capacity, or silver-plated copper, which has a 5-10% lower resistivity than tin-plated copper.

Data transmission elements 414 can include any number of wires, optical transmission lines, or other elements capable of transferring data as electrical pulses, waves, optical pulses, or the like. For example, in FIGS. 4C and 4D, data transmission elements 414 are shown to include a set of four wires. In one example, data transmission elements 414 include a twisted pair of conductors with foil and copper braid isolation to prevent interference. In another example, data transmission elements 414 includes a miniaturized coax or twin axial conduct arrangement. However, in another example, data transmission elements 414 may include a single fiber optic cable. In some implementations, conductors 412 and/or data transmission elements 414 terminate in annular (e.g., ring-shaped) or circular terminals, e.g., within connector 404.

FIG. 4D shows a cut-away perspective of connector 404, e.g., illustrating the annular-shaped terminations of conductors 412 and data transmission elements 414. In addition, this perspective illustrates the above-mentioned insulating and/or shielding layers of cable 400. For example, in the illustrated configuration, connector 404 includes a first shielding layer 416 surrounding a first insulating layer 418, which together surround conductors 412. As described herein, first shielding layer 416 can include any suitable material(s) for providing electrical and/or electric and magnetic field (EMF) shielding. For example, first shielding layer 416 may be made of a braided copper wire mesh. First insulating layer 418 may include any electrically insulating material (e.g., a dielectric). Connector 404 may similarly include a second shielding layer 420 and/or a second insulating layer 422 that surround data transmission elements 414. In some implementations, the individual conductors of conductors 412 and/or data transmission elements 414 may further be separated by insulating layers 424, 426.

As shown, connector 404 can further include a passive identification tag 428 for identifying the cable and connector. Specifically, passive identification tag 428 can be read by a UAV or base station, e.g., responsive to be connected, such that the specific arrangement of aerial lighting system 100 can be detected. For example, passive identification tag 428 can be encoded with a unique ID associated with cable 400 and/or a designator or ID associated with each connector thereof (e.g., connector A or B), which can be detected by a connected UAV or base station to identify cable inventory and verify assembly sequence. In the example shown, passive identification tag 428 is a radiofrequency identification (RFID) tag. Accordingly, each UAV (e.g., UAV 300) and/or base station 128 of aerial lighting system 100 may include an RFID transceiver for reading the information contained on passive identification tag 428. However, other suitable passive identification tags are contemplated herein. For example, passive identification tag 428 could include a machine-readable code (e.g., a QR code) readable by a camera of a UAV or base station. Regardless, responsive to a connection between connector 404 and an end device, the information contained on passive identification tag 428 may be communicated to base station 128 to determine and track the configuration of aerial lighting system 100.

In one specific arrangement, e.g., provided as a non-limiting example herein, cable 400 is arranged as a multi-concentric coaxial cable. In this arrangement, conductors 412 may instead be arranged as a central conductor to carry DC power. In some such implementations, conductors 412 may be an 8-AWG, 19-strand, braided, tinned copper cables. Cable 400 may further include a first dielectric layer of extruded virgin Teflon fluoropolymer tubing with a 0.25 inch outer diameter and 0.1875 inch inner diameter. The first shield layer of cable 400 may be a 16-AWG 32-strand copper cable braided over dielectric tube that serves as power ground and shield. A second dielectric layer of extruded modified ethylene tetrafluoroethylene (ETFE) tubing having a 0.375 inch outer diameter, 0.31 inch inner diameter, which provides 500V/mil insulation capacity. Cable 400 may include a second braided shield layer (e.g., of copper) covering 22 AWG copper signal conductors arranged in twisted pairs to carry data (e.g., helical stranding minimizes EMI). In this example, the outer jacket of cable 400 is formed of abrasion and cut-resistant thermoplastic polyurethane and contains Kevlar strength members for load bearing, e.g., for a uniform architecture that eliminates transitions, enhances flexibility, and provides reliable isolation between conductors.

Figure 4E:
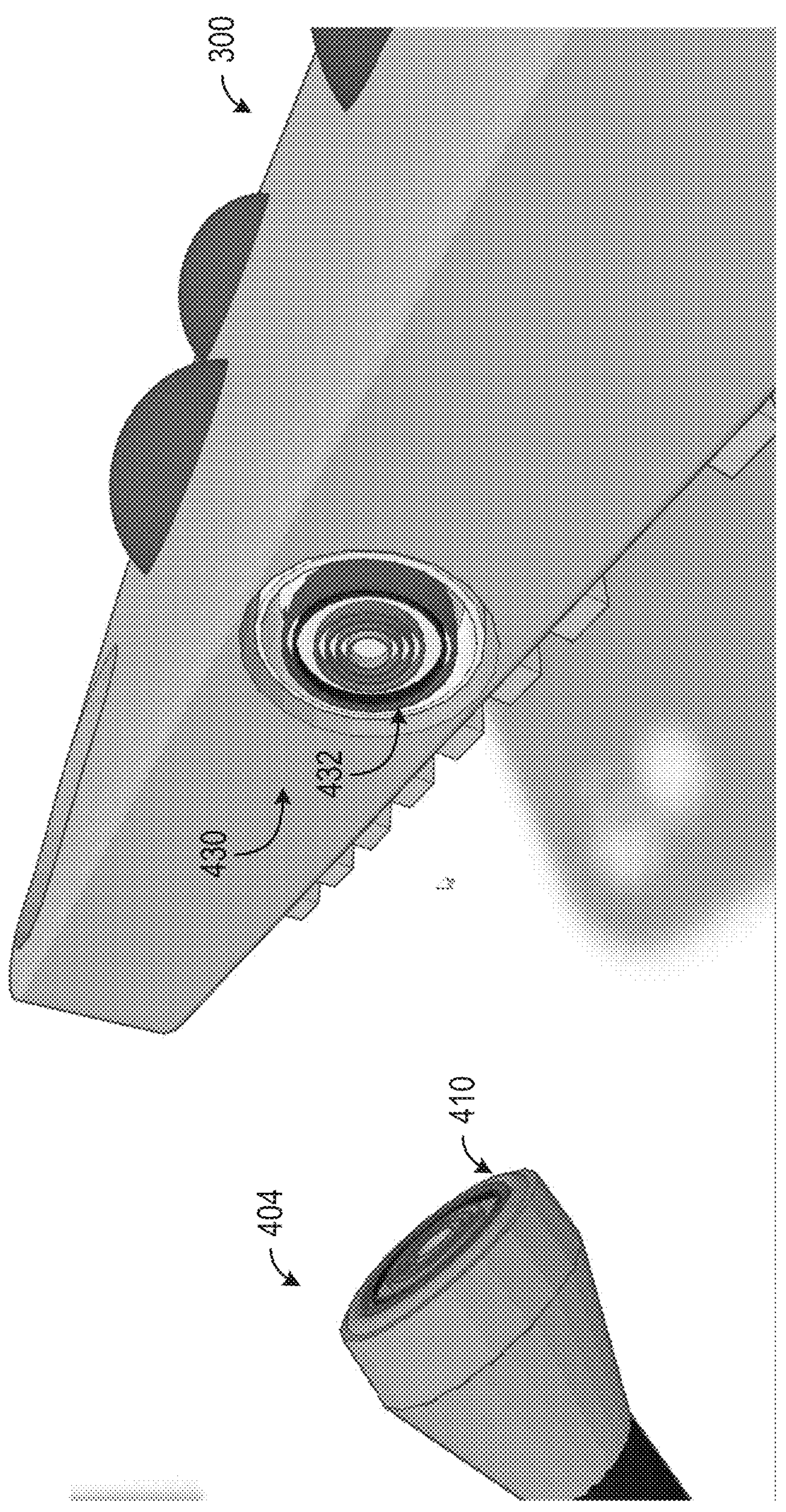
FIGS. 4E and 4F are diagrams of the connection point on a UAV for interfacing with the cable of FIGS. 4A-4D, according to some implementations.
Figure 4F:
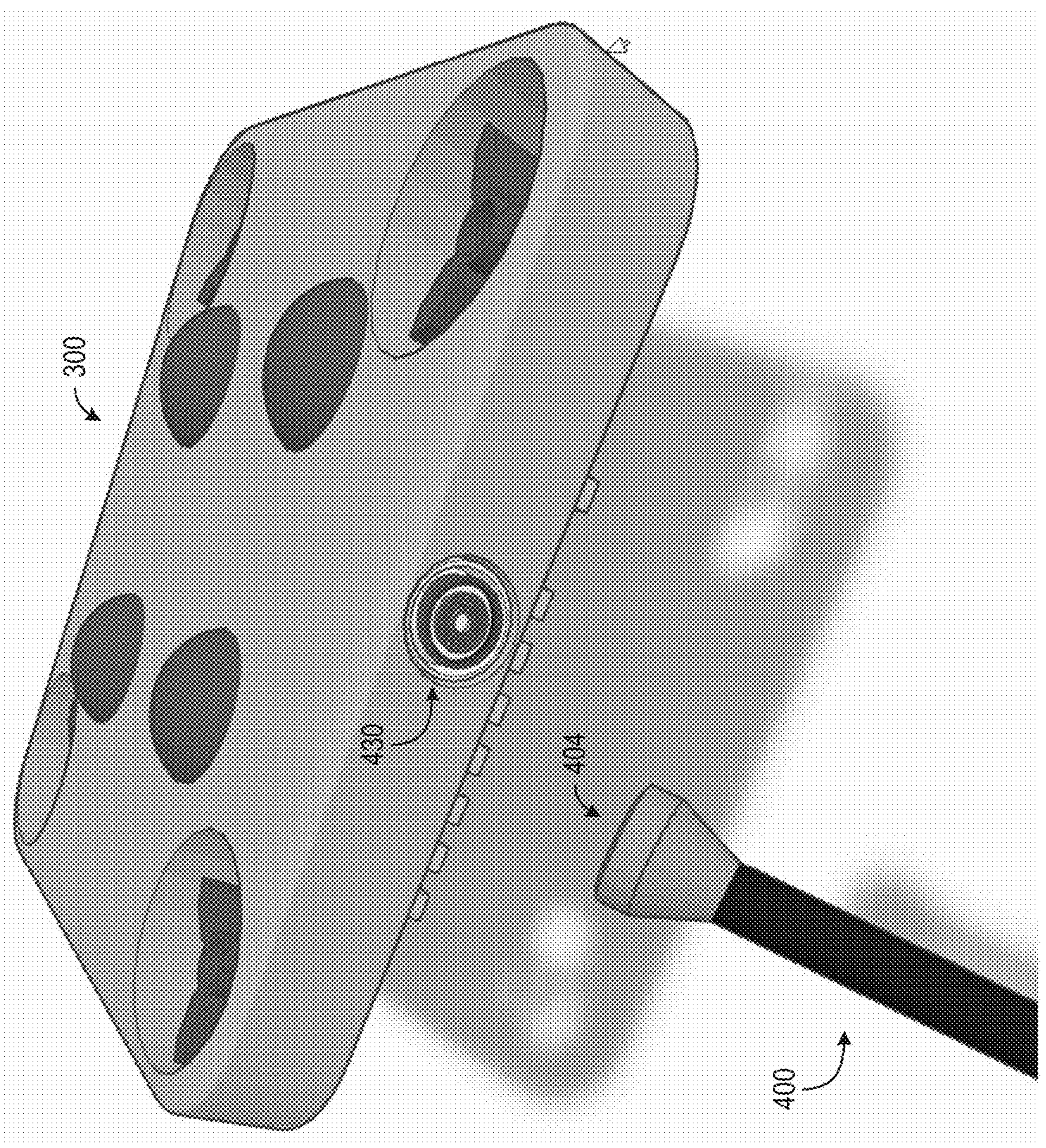

Referring now to FIGS. 4E and 4F, an example arrangement of connection point 430 for interfacing with connector 404 of cable 400 is shown, according to some implementations. While shown as a component of UAV 300 (e.g., and thereby, any of UAVs 102-108), it should be understood that connection point 430 may also be included on base station 128. Connection point 430 is shown to include a plurality of annular (e.g., ring-shaped) conductive interfaces 432 that correspond to conductors 412 and data transmission elements 414 of connector 404. While not illustrated, it should also be appreciated that connection point 430 can include an internal or embedded electromagnet that can be selectively activated, e.g., by UAV 300, to secure the connection to connector 404. In these figures, the convex ring shape of magnetically conductive interface 410 is more clearly illustrated; however, as noted above, the shape/configuration of magnetically conductive interface 410 is not necessarily limited in this regard. Regardless, in implementations wherein magnetically conductive interface 410 has a convex ring shape, connection point 430 may include a corresponding ring-shaped indentation (e.g., a concave, ring-shaped interface) to facilitate alignment of connector 404 with connection point 430.

Recovery Operations

Referring now to FIGS. 5A-5E, a recovery operation for reconnecting a UAV (e.g., one of UAVs 102-108) to a corresponding cable is illustrated, according to some implementations. As discussed in greater detail below, this "recovery operation" is one of a plurality of different operating modes for UAVs 102-108 which allows aerial lighting system 100 to operate as a sort of "seal-healing network," e.g., wherein the connections and arrangement of UAVs 102-108 can be automatically restored in the event that one of cables 120-126 are disconnected, one of UAVs 102-108 fails, or any other scenario in which one of UAVs 102-108 is disconnected from the system during operations. This sort of "seal-healing" ability is enabled due to the unique magnetic connection between UAVs 102-108 and cables 120-126 (e.g., including the arrangement of cable 400 and connector 404 thereof), which allows for UAVs to be temporarily disconnected from the network of UAVs, e.g., for both equipment safety and the safety of persons in the area being illuminated (e.g., so that a falling object does not cause all of UAVs 102-108 to crash, potentially causing equipment damage and/or bodily harm).

In this example, three UAVs 502-506, connected by cables 508 and 510, are shown in a normal operating mode, e.g., with UAVs 502-506 being airborne and tethered to a base station (not shown). It should be appreciated that UAVs 502-506 are generally the same as UAVs 102-108 (and thereby UAV 300) as discussed above. Accordingly, cables 508, 510 are the same as cables 120-126 (and thereby cable 400) as also discussed above. Therefore, in normal operations, UAVs 502-506 are receiving power and data via cables 508, 510.

Figures 5A, 5B:
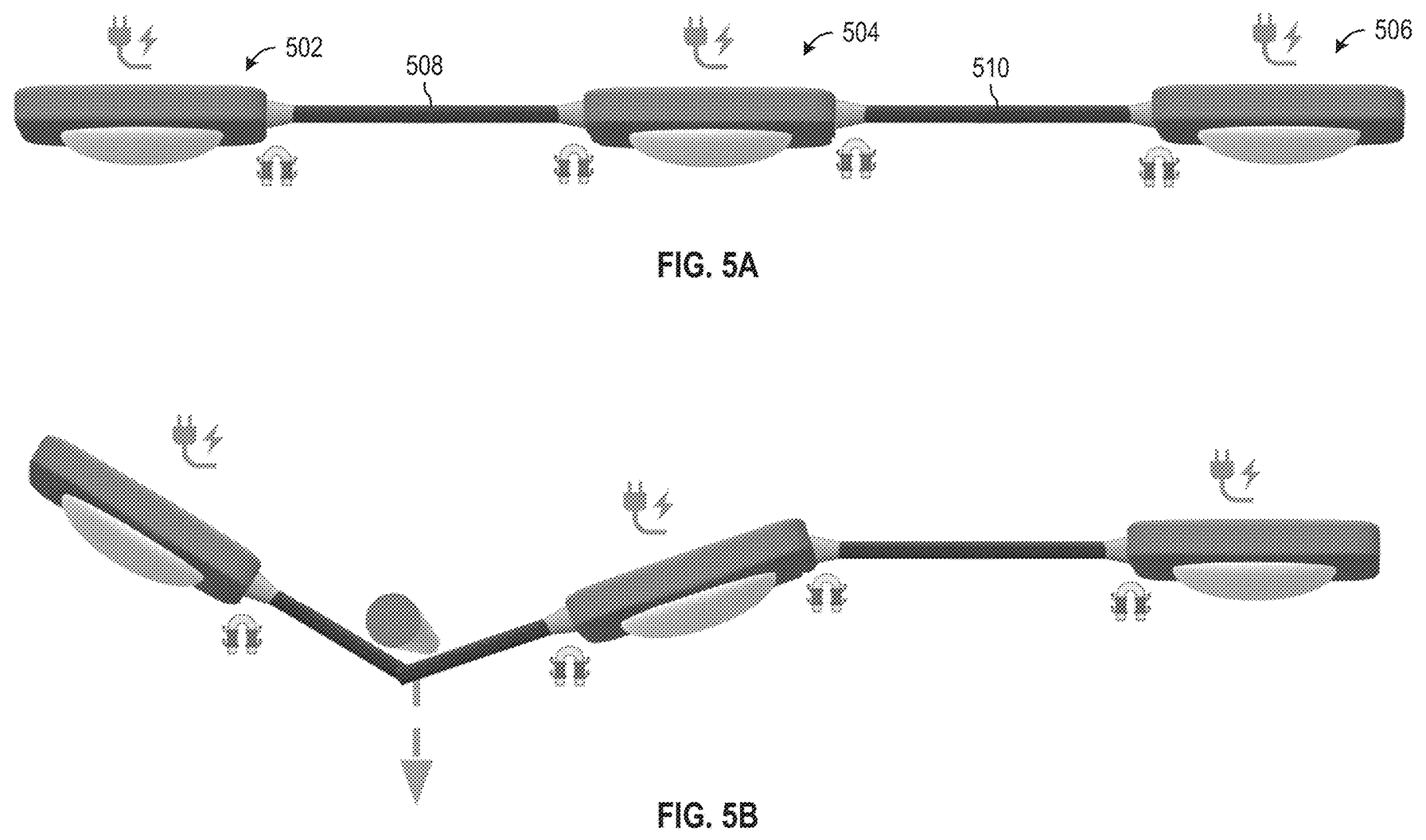
Figure 5C:
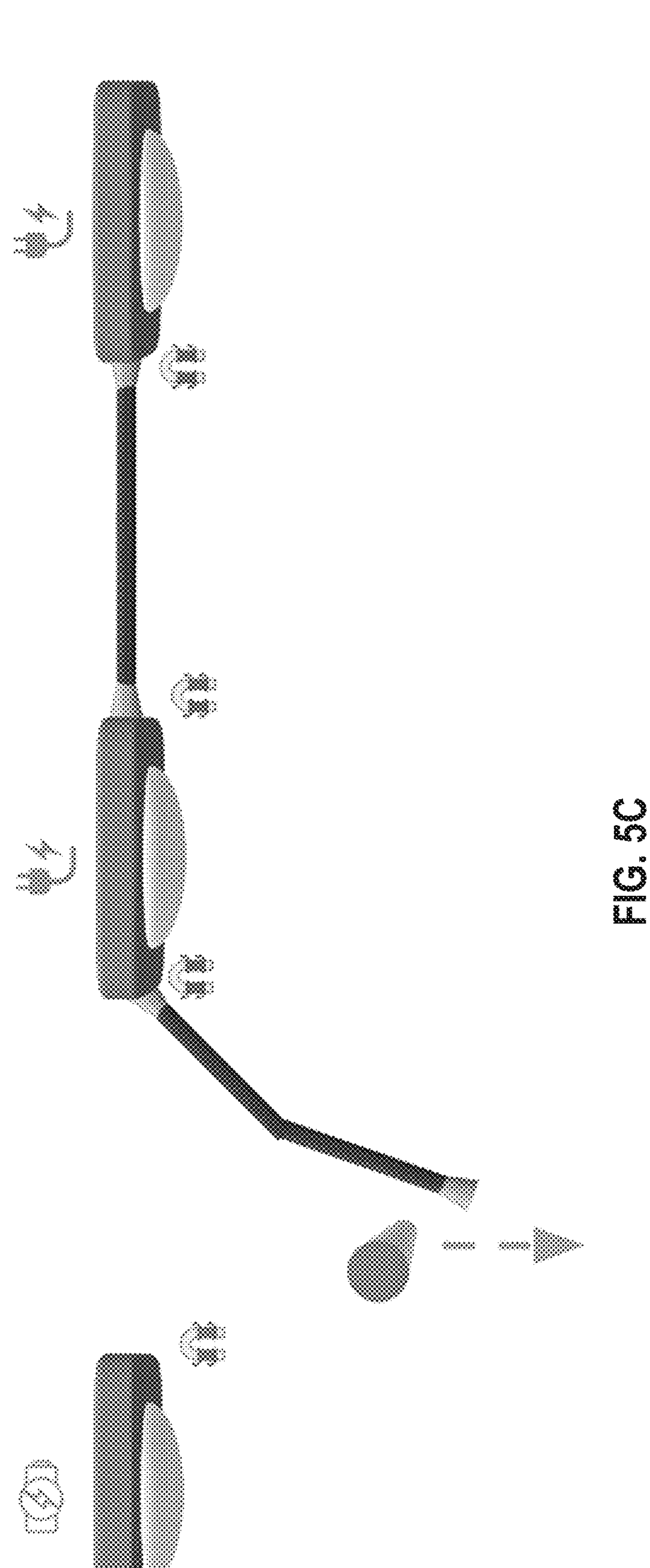

A situation in which an object (e.g., a tree branch) falls onto cable 508 is illustrated in FIGS. 5B and 5C, in particular. To avoid damage to UAVs 502-506 and/or to prevent the entire aerial lighting system from being non-operational, cables 508, 510 can be selectively disconnected from a corresponding UAV. As discussed above with respect to cable 400, for example, cables 508, 510 may be connected to UAVs 502-506 via electromagnetic connections. Therefore, in the example scenario shown, cable 508 can be disconnected from UAV 502 (or UAV 504) by deactivating the electromagnet of UAV 502 or due to a force on cable 508 (e.g., due to the falling object) exceeding a strength of the magnetic connection between UAV 502 and cable 508. It should be appreciated, as well, that a falling object is only one example of a situation in which a UAV would need to disconnect itself from the aerial lighting system. For example, other scenarios could include one of cables 508, 510 becoming tangled on an object, one of UAVs 502-506 losing flight capabilities (e.g., due to a mechanical error), and so on.

Figure 5D:
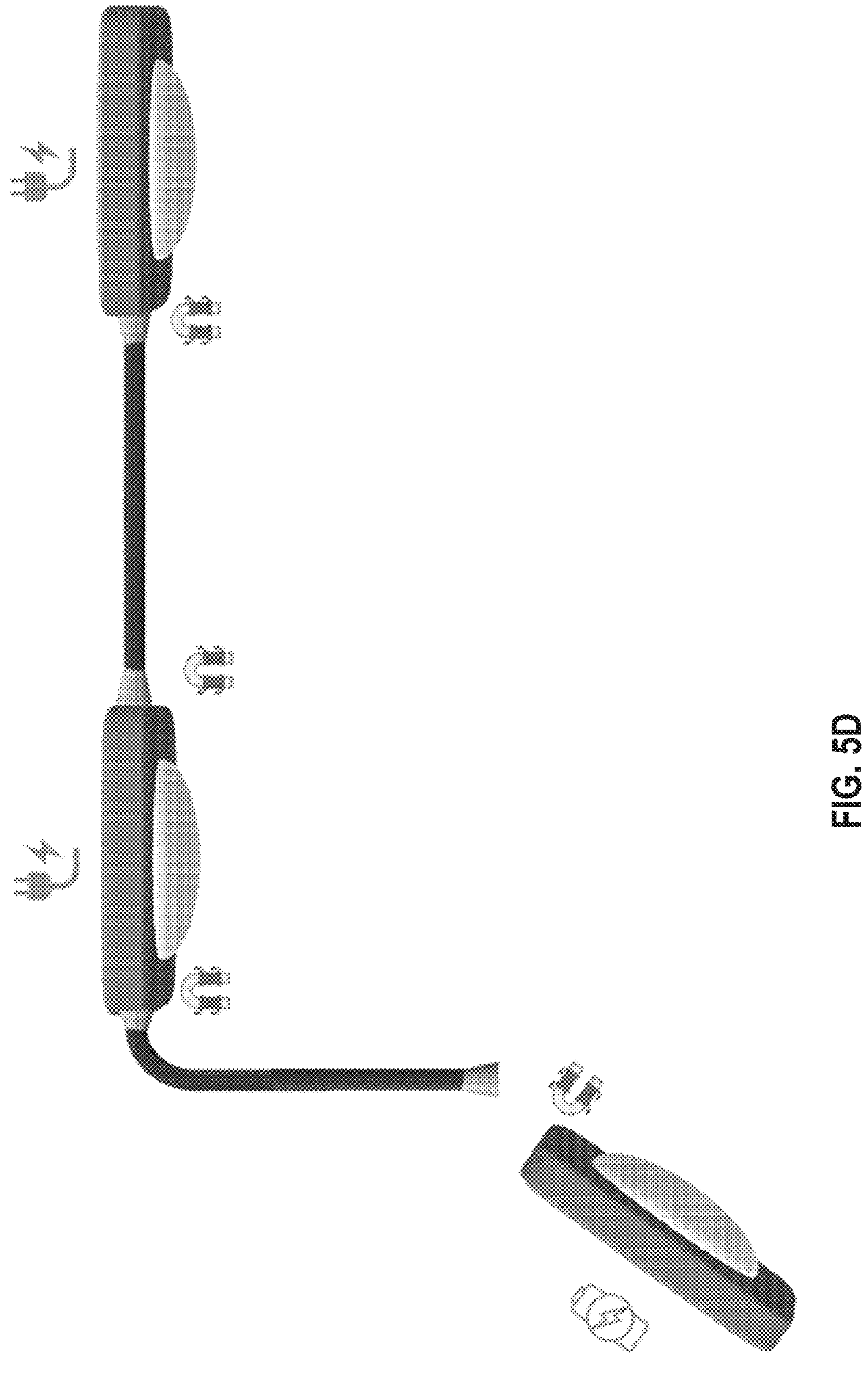

Responsive to detecting that cable 508 has been disconnected—or responsive to causing cable 508 to disconnect due to detecting an unsafe situation—UAV 502 may execute the above-mentioned recovery operation by first switching to an onboard emergency power supply (e.g., a battery, as discussed below) and then maneuvering to a position of the free connector at the end of cable 508 (e.g., as shown in FIG. 5D). In some implementations, UAV 502 determines a position of the connector at the end of the disconnected cable based on data from an onboard sensor array and/or based on wireless communications from UAV 504 or 506. For example, UAV 502 may use onboard sensors alone to detect the connector of cable 508 or may reference data from UAV 504 to predict a position of the connector of cable 508, e.g., based on the position of UAV 504 and a known length of cable 508. It should be appreciated that, while disconnected, UAV 502 may be able to communicate with UAVs 504, 506 and/or a base station via a wireless transceiver, as discussed below. In this regard, UAV 502 may include redundant systems for power (e.g., a battery, as mentioned above), communications, and navigation, that allow for temporary autonomous operations.

Figure 5E:
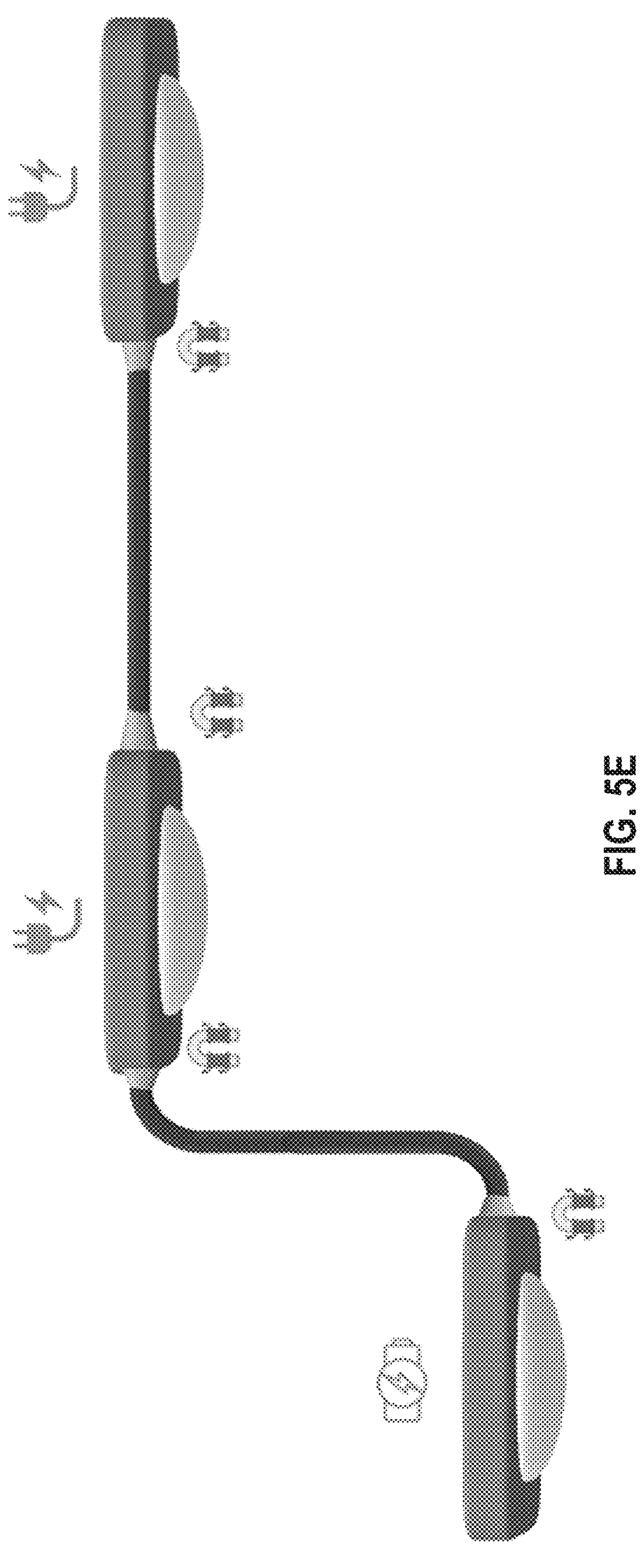

After determining the position of the connector, UAV 502 maneuvers (e.g., by operating its rotors) proximate to the connector. "Proximate," in this case, may refer to a position within a threshold distance of the connector that is sufficient to reconnect the connector to UAV 502 via activation of the electromagnet. For example, the threshold distance may be less than four inches. UAV 502 may therefore activate the electromagnet in its connection point (e.g., connection point 430) shortly after detecting that cable 508 has been disconnected (e.g., prior to maneuvering proximate to the connector, so that the electromagnet is energized while UAV 502 maneuvers) or once UAV 502 determines that it is in proximity to the connector. In some implementations, while attempting to reconnect cable 508, UAV 502 makes continuous adjustments to its positioning to align the connector of cable 508 with the connection point on UAV 502. Once cable 508 is reconnected to UAV 502 (e.g., as shown in FIG. 5E), UAV 502 can maneuver back to its original position with respect to UAVs 504 and 506.

UAV Stacking and Deployment

Figure 6B:
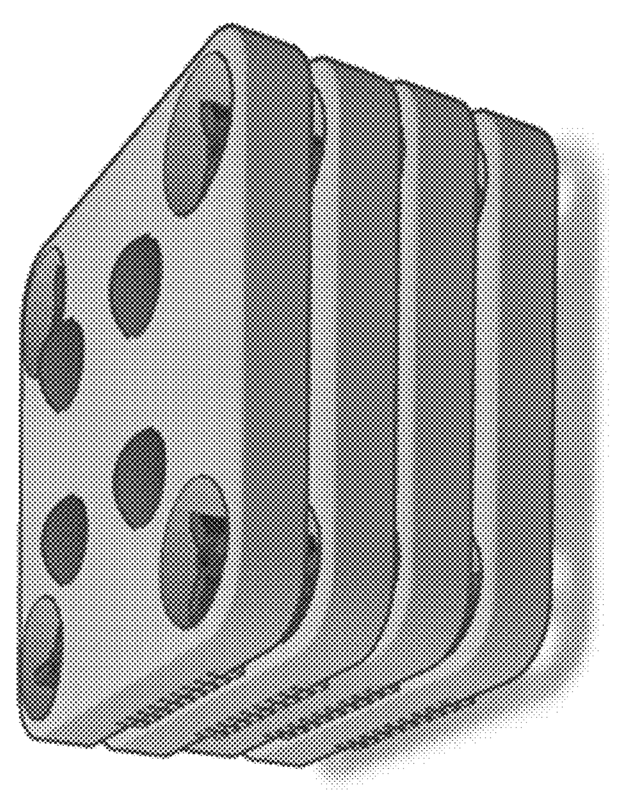
FIG. 6B is a diagram of a plurality of UAVs arranged in a stack, according to some implementations.
Figure 6A:
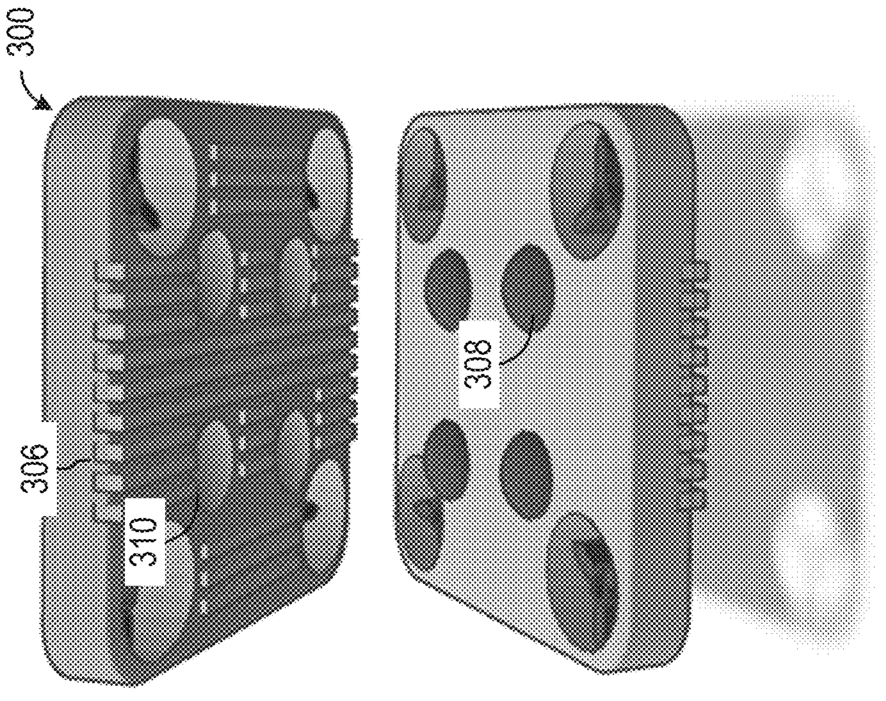
FIG. 6A is a diagram showing alignment elements arranged on a pair of UAVs to facility stacking, according to some implementations.

For portability and ease of use, the UAVs of the disclosed aerial lighting system (e.g., UAVs 102-106) may be configured to stack when not in use (e.g., when not airborne). FIGS. 6A and 6B illustrate aspects of this "UAV stacking" feature. For example, FIG. 6B shows a stack of inactive four UAVs. To facilitate stacking, each UAV of aerial lighting system 100 may include alignment elements that interface with the alignment elements of another UAV. FIG. 6A shows such an implementation in which two UAVs (e.g., UAV 102 and 104, two of UAV 300) are configured to be stacked. As shown, each UAV includes first alignment elements 308 and second alignment elements 310, positioned on opposite sides of the UAV, such that first alignment elements 308 of a first UAV can interface with second alignment elements 310 of a second UAV for alignment of the stack and improved stability.

As described herein, first alignment elements 308 and second alignment elements 310 may be any shape, size, or arrangement. In the example of FIGS. 6A and 6B, first alignment elements 308 include a plurality of convex protrusions that extend from a top surface of the UAV, while second alignment elements 310 include a corresponding plurality of concave indentions formed in a bottom surface of the UAV. As will be appreciated, first alignment elements 308 are configured to interface with second alignment elements 310 when the UAVs are stacked. In some implementations, one or more of first alignment elements 308 and/or second alignment elements 310 may include small electromagnets embedded therein that can be selectively activated to "pull" the corresponding alignment elements of another drone into place during docking. In some such implementations, once the UAVs are stacked, the electromagnets may be de-energized.

It should be appreciated that each UAV of aerial lighting system 100 can include any number of corresponding alignment elements. For example, while four of first alignment elements 308 and second alignment elements 310 are shown, the present disclosure is not intended to be limiting in this regard, and the UAVs could include more or fewer alignment elements. Further, other types of alignment elements are also contemplated herein. For example, each UAV may include a magnet positioned on or embedded in a first side of the UAV and a corresponding magnetically conductive pad (e.g., a piece of metal) positioned on or embedded in a second side of the UAV such that, when two UAVs are positioned for stacking, the magnet of a first UAVs attracts the magnetically conductive pad of the second UAVs to align the UAVs. In some implementations, the magnet positioned on or embedded in a first side of the UAV may be an electromagnetic that can be selectively energized, e.g., during stacking of the UAVs.

Base Station

Figure 7A:
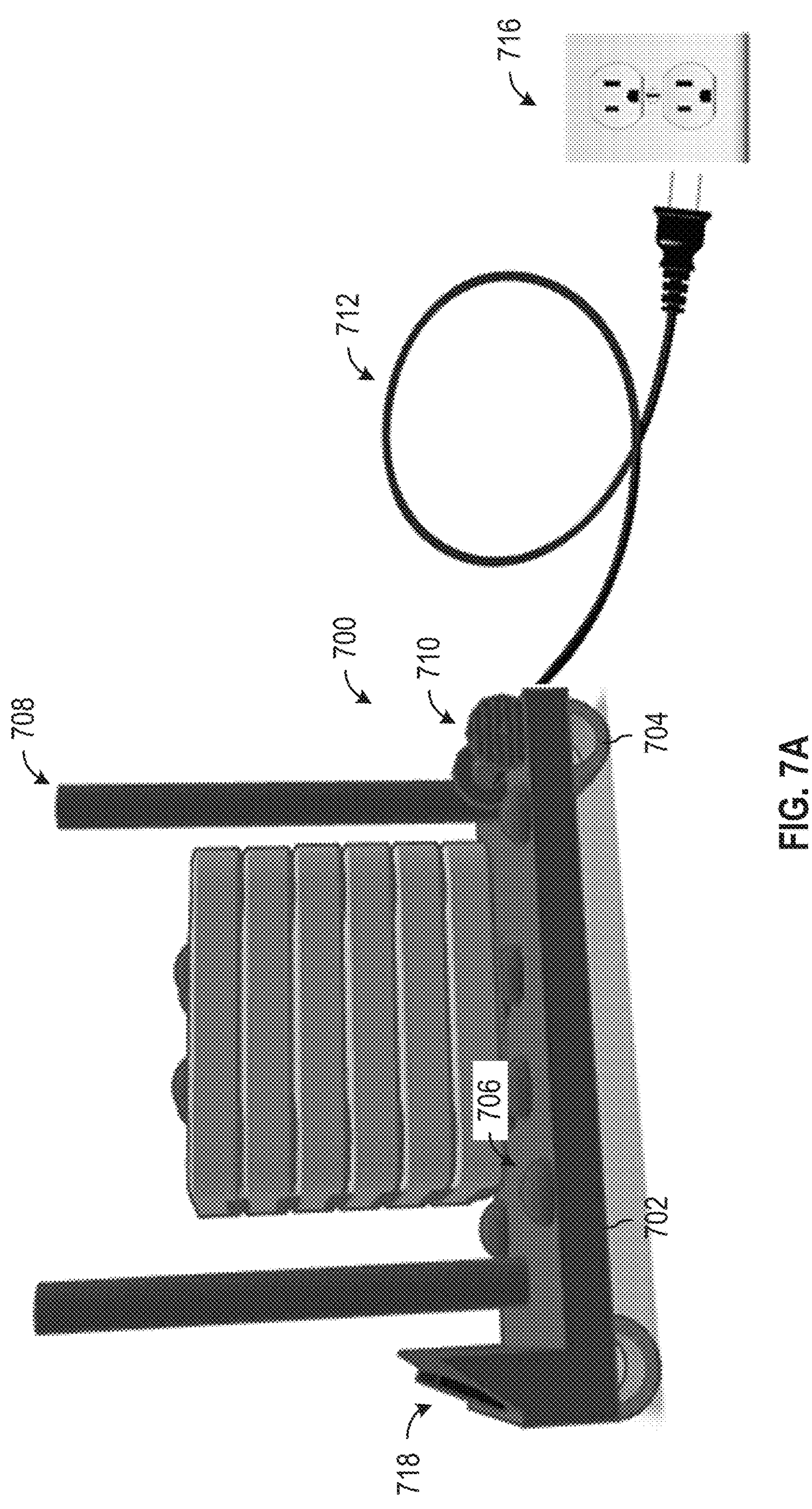
FIGS. 7A-7C are diagrams of a base station for retaining a stack of UAVs, according to some implementations.
Figure 7B:
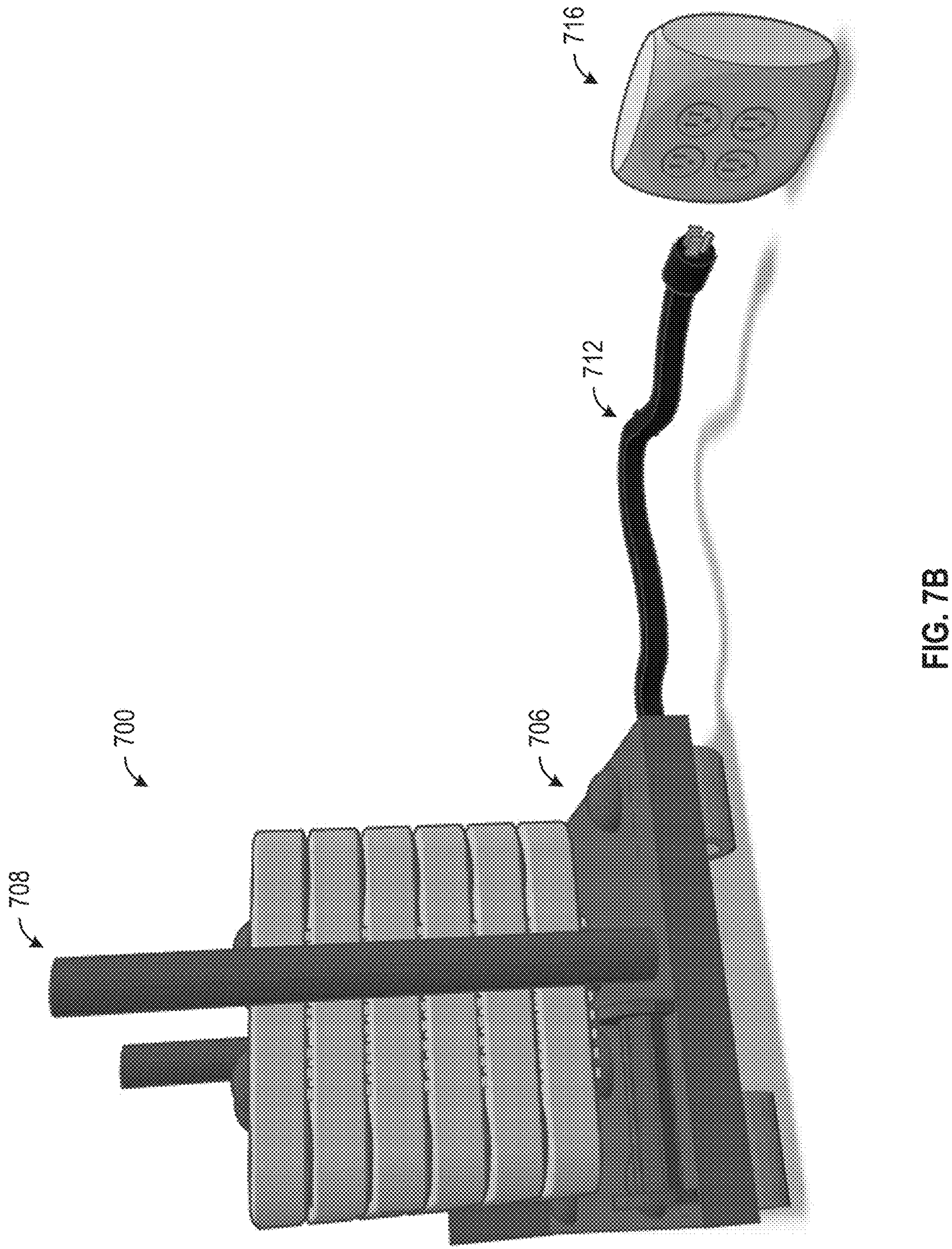
Figure 7C:

Referring now to FIGS. 7A-7C, diagrams of a base station 700 for retaining a stack of UAVs are shown, according to some implementations. It should be appreciated that base station 700 may represent one configuration of base station 128 as discussed above. Base station 700 is shown to include a chassis 702 which may or may not include wheels 704 to facilitate transportation of base station 700. Mounted on, or integrated with, chassis 702 are a plurality of alignment elements 706 to facilitate positioning and stacking of UAVs onto base station 700. In the example shown, alignment elements 706 may include a plurality of convex protrusions (e.g., similar to first alignment elements 308, as described above) that interface with corresponding convex protrusions on a bottom side of a first UAV. In some such implementations, one or more of alignment elements 706 may include an embedded electromagnet that can be selectively activate during UAV docking. However, as discussed above with respect to first alignment elements 308 and second alignment elements 310, other types of alignment elements are contemplated herein. For example, alignment elements 706 may alternatively include an electromagnet that attracts a magnetically conduct pad on a bottom side of the first UAV.

Base station 700 is further shown to include cable management elements 708 for retaining the power-and-data cables (e.g., cables 120-126) that connect the UAVs of aerial lighting system 100 when arranged in a stack on base station 700. In the implementation shown in FIG. 7A, cable management elements 708 include two poles—also called "spooling poles"—that extends vertically from chassis 702. It should be appreciated, however, that cable management elements 708 may include only one such spooling pole, or more than two spooling poles, and that other components for managing cable 120-126 are contemplated herein. When deploying from a stack, each UAV may first maneuver in a particular pattern, e.g., before proceeding to an airborne operating position, to unwind a corresponding cable from cable management elements 708. Likewise, when returning to dock, UAVs may perform a recall operation that includes a series of maneuvers to wind a corresponding cable around cable management elements 708.

In some implementations, base station 700 can further include a spool 710 for retaining a first power-and-data cable that connects base station 700 to a first UAV. As mentioned above, for example, the cable that connects a first UAV, e.g., in a network of UAVs, to base station 700 may be longer than any of the other cable that extend between UAVs, to account for the distance and height that the first UAV needs to extend from base station 700 for operations. Accordingly, this first cable determines the initial deployment height (e.g., 20-40 ft) of the UAVs. The first cable can be wound about spool 710 when the UAVs are stacked and can be unwound from spool 710 when the first UAV is deployed. While not shown, spool 710 may be motorized to facilitate winding/unwinding of the first cable.

As mentioned above, base station 700 may be configured to obtain power from an external power source for operating an onboard controller (discussed below) and for supplying power to UAVs 102-108. Accordingly, base station 700 may include a power cable 712 which connects to an external power source 716, such as a wall outlet, a generator, a battery, a solar panel array, an electric vehicle, etc. Additionally, or in lieu of power cable 712, base station 700 may include an onboard power supply, such as a battery or supercapacitor bank. Base station 700 may house an onboard controller within chassis 702, e.g., at or near a touchscreen interface 718. As shown, touchscreen interface 718 is positioned on an outer surface of chassis 702 to display information relating to UAVs 102-108—or, more broadly, aerial lighting system 100—to a user. For example, touchscreen interface 718 may display statuses, configuration data, and other relevant information. As discussed below, touchscreen interface 718 may also accept user inputs to facilitate user interaction with aerial lighting system 100.

Operations

Figure 8:
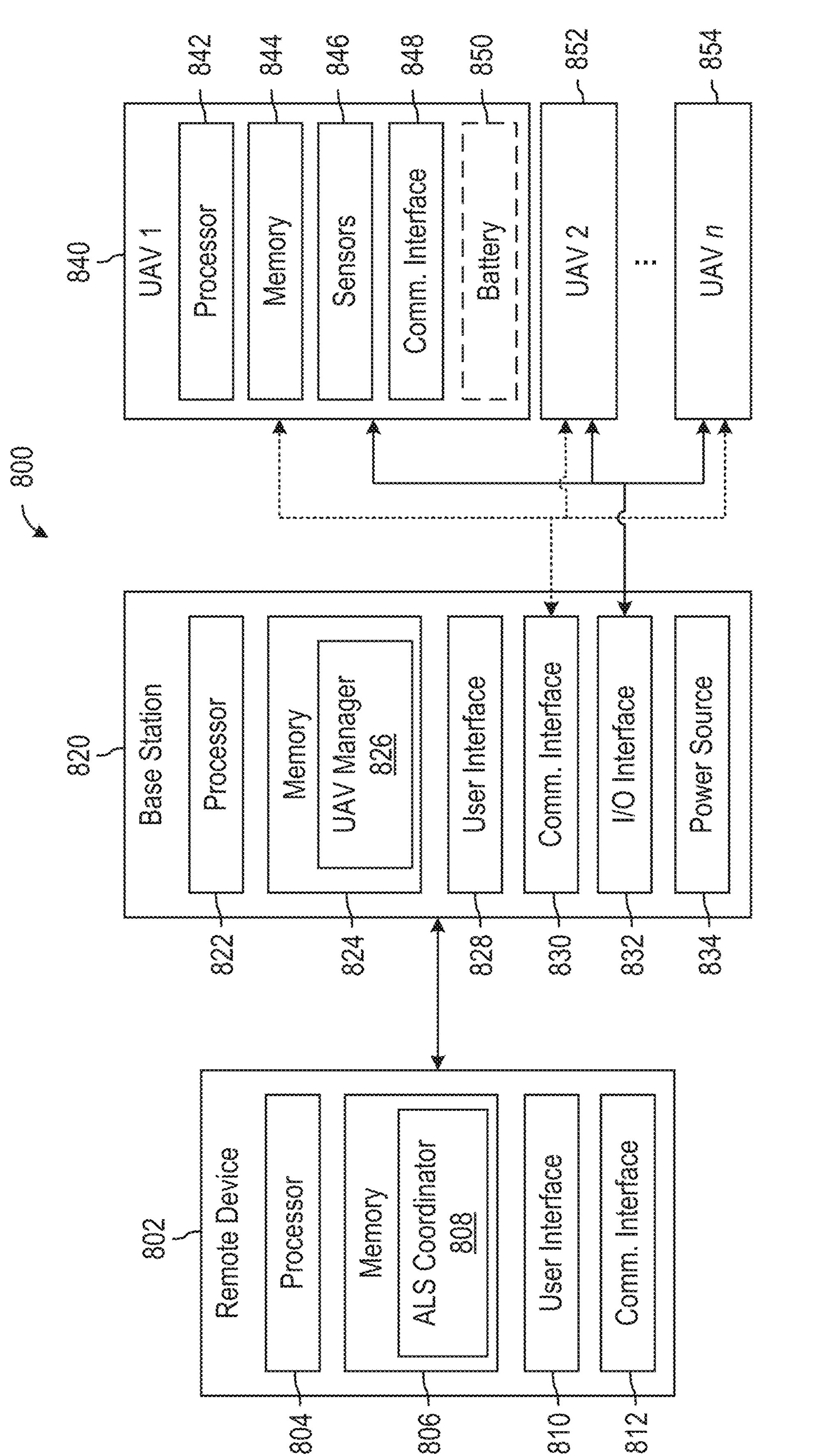
FIG. 8 is a block diagram of the aerial lighting system described herein, according to some implementations.

Referring now to FIG. 8, a block diagram of an aerial lighting system 800 is shown, according to some implementations. Generally, aerial lighting system 800 may be the same as aerial lighting system 100, described above, while illustrating additional features of each of the components of aerial lighting system 100. For example, aerial lighting system 800 includes a base station 820, which is the same as or similar to base station 128 (and thereby base station 700) as described above, and a plurality of UAVs 840, 852, 854, which are the same as any of UAVs 102-106 (and thereby UAV 300). While only three UAVs are illustrated, it should be understood that aerial lighting system 800 may include any number of UAVs (e.g., as few as one, or two or more). Base station 820 and UAVs 840, 852, 854 are described in greater detail below.

First, however, aerial lighting system 800 is also shown to include a remote device 802 in communication with base station 820. As described herein, remote device 802 may generally represent any remote computing device capable of performing the processes and functionality described herein. For example, remote device 802 may be a smartphone, a tablet, a laptop computer, or other suitable computing device. Regardless, remote device 802 is shown to include a processor 804 and memory 806. Processor 804 can be a general-purpose processor, an application specific integrated circuit (ASIC), one or more field programmable gate arrays (FPGAs), a group of processing components (e.g., a central processing unit (CPU)), or other suitable electronic processing structures. In some implementations, processor 804 is configured to execute program code stored on memory 806 to cause remote device 802 to perform one or more operations, as described below in greater detail. It will be appreciated that, in implementations where remote device 802 is part of another computing device, the components of remote device 802 may be shared with, or the same as, the host device.

Memory 806 can include one or more devices (e.g., memory units, memory devices, storage devices, etc.) for storing data and/or computer code for completing and/or facilitating the various processes described in the present disclosure. In some implementations, memory 806 includes tangible (e.g., non-transitory), computer-readable media that stores code or instructions executable by processor 804. Tangible, computer-readable media refers to any physical media that is capable of providing data that causes remote device 802 to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, memory 806 can include random access memory (RAM), read-only memory (ROM), erasable programmable read-only memory (EPROM), electronically erasable programmable read-only memory (EEPROM), hard drive storage, temporary storage, non-volatile memory, flash memory, optical memory, or any other suitable memory for storing software objects and/or computer instructions. Memory 806 can include database components, object code components, script components, or any other type of information structure for supporting the various activities and information structures described in the present disclosure. Memory 806 can be communicably connected to processor 804, such as via a processing circuit (not shown), and can include computer code for executing (e.g., by processor 804) one or more processes described herein.

While shown as individual components, it will be appreciated that processor 804 and/or memory 806 can be implemented using a variety of different types and quantities of processors and memory. For example, processor 804 may represent a single processing device or multiple processing devices. Similarly, memory 806 may represent a single memory device or multiple memory devices. Additionally, in some implementations, remote device 802 may be implemented within a single computing device (e.g., one server, one housing, etc.). In other implementations, remote device 802 may be distributed across multiple servers or computers (e.g., that can exist in distributed locations). For example, remote device 802 may include multiple distributed computing devices (e.g., multiple processors and/or memory devices) in communication with each other that collaborate to perform operations.

Remote device 802 is shown to include a user interface 810 that facilities user interaction with remote device 802. In particular, user interface 810 may include one or more components for displaying or otherwise presenting information to a user and/or for receiving user inputs. For example, user interface 810 may include a display, lights, speakers, or other components for presenting information and a keyboard, mouse, number pad, buttons, a microphone, etc., for receiving user inputs. In some implementations, user interface 810 is a touchscreen display (e.g., as is common on smartphones) that can both display information and receive inputs. However, it should be appreciated that user interface 810 may include more than one user interface component. For example, user interface 810 may include a touchscreen display, lights (e.g., LEDs), a speaker, and a microphone, or any combination of other user interface components.

Remote device 802 is also shown to include a communications interface 812 that facilitates communications between remote device 802 and any external components or devices, including base station 820. Accordingly, communications interface 812 can be or can include a wired or wireless communications interface (e.g., jacks, antennas, transmitters, receivers, transceivers, wire terminals, etc.) for conducting data communications, or a combination of wired and wireless communication interfaces. In some implementations, communications via communications interface 812 are direct (e.g., local wired or wireless communications) or via a network (e.g., a WAN, the Internet, a cellular network, etc.). For example, communications interface 812 may include one or more Ethernet ports for communicably coupling remote device 802 to a network (e.g., the Internet). In another example, communications interface 812 can include a Wi-Fi transceiver for communicating via a wireless communications network. In yet another example, communications interface 812 may include cellular or mobile phone communications transceivers.

Memory 806 is shown to include an "aerial lighting system" coordinator—or an ALS coordinator 808—for generating configuration data for aerial lighting system 800 and/or transmitting configuration data to base station 820, among other tasks described herein. ALS coordinator 808 may include or execute a software application (e.g., a mobile application, if remote device 802 is a smartphone) that allows a user to interact with and control base station 820 and/or UAVs 840, 852, 854. In some implementations, ALS coordinator 808 can execute a configuration wizard that wirelessly connects remote device 802 to base station 820 via a network (e.g., a Wi-Fi network) or direct connection (e.g., Bluetooth®). In some implementations, ALS coordinator 808 includes an application programming interface (API) that facilitates communications with base station 820. In some implementations, ALS coordinator 808 is configured to regularly check for security and feature updates (e.g., via a network, such as the Internet) and to coordinate the installation of such updates onto base station 820 and/or UAVs 840, 852, 854. For example, responsive to identifying a new security update, remote device 802 may upload the update to base station 820 and/or UAVs 840, 852, 854 for installation, e.g., upon connecting to base station 820. Additional features of ALS coordinator 808 may be realized in conjunction with the description of FIG. 9, below.

Base station 820 is shown to include a processor 822 and memory 824. Processor 822 can be a general-purpose processor, an ASIC, one or more FPGAs, a group of processing components (e.g., a CPU), or other suitable electronic processing structures. In some implementations, processor 822 is configured to execute program code stored on memory 824 to cause base station 820 to perform one or more operations, as described below in greater detail. It will be appreciated that, in implementations where base station 820 is part of another computing device, the components of base station 820 may be shared with, or the same as, the host device. For example, in some implementations, certain functions of base station 820 may be performed by remote device 802 and/or base station 820 may utilize the processor and/or memory of remote device 802.

Memory 824 can include one or more devices (e.g., memory units, memory devices, storage devices, etc.) for storing data and/or computer code for completing and/or facilitating the various processes described in the present disclosure. In some implementations, memory 824 includes tangible (e.g., non-transitory), computer-readable media that stores code or instructions executable by processor 822. Tangible, computer-readable media refers to any physical media that is capable of providing data that causes base station 820 to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, memory 824 can include RAM, ROM, EPROM, EEPROM, hard drive storage, temporary storage, non-volatile memory, flash memory, optical memory, or any other suitable memory for storing software objects and/or computer instructions. Memory 824 can include database components, object code components, script components, or any other type of information structure for supporting the various activities and information structures described in the present disclosure. Memory 824 can be communicably connected to processor 822, such as via a processing circuit (not shown), and can include computer code for executing (e.g., by processor 822) one or more processes described herein.

While shown as individual components, it will be appreciated that processor 822 and/or memory 824 can be implemented using a variety of different types and quantities of processors and memory. For example, processor 822 may represent a single processing device or multiple processing devices. Similarly, memory 824 may represent a single memory device or multiple memory devices. Additionally, in some implementations, base station 820 may be implemented within a single computing device (e.g., one server, one housing, etc.). In other implementations, base station 820 may be distributed across multiple servers or computers (e.g., that can exist in distributed locations). For example, base station 820 may include multiple distributed computing devices (e.g., multiple processors and/or memory devices) in communication with each other that collaborate to perform operations.

Base station 820 is shown to include a user interface 828 that facilities user interaction with base station 820. In particular, user interface 828 may include one or more components for displaying or otherwise presenting information to a user and/or for receiving user inputs. For example, user interface 828 may include a display, lights, speakers, or other components for presenting information and a keyboard, mouse, number pad, buttons, a microphone, etc., for receiving user inputs. In some implementations, user interface 828 is a touchscreen display (e.g., as is common on smartphones) that can both display information and receive inputs. However, it should be appreciated that user interface 828 may include more than one user interface component. For example, user interface 828 may include a touchscreen display, lights (e.g., LEDs), a speaker, and a microphone, or any combination of other user interface components. As shown in FIGS. 7A and 7C, user interface 828 may be mounted to or otherwise positioned on a chassis of base station 820.

Base station 820 is also shown to include a communications interface 830 that facilitates communications between base station 820 and any external components or devices, including remote device 802 and (optionally) UAVs 840, 852, 854. Accordingly, communications interface 830 can be or can include a wired or wireless communications interface (e.g., jacks, antennas, transmitters, receivers, transceivers, wire terminals, etc.) for conducting data communications, or a combination of wired and wireless communication interfaces. In some implementations, communications via communications interface 830 are direct (e.g., local wired or wireless communications) or via a network (e.g., a WAN, the Internet, a cellular network, etc.). For example, communications interface 830 may include one or more Ethernet ports for communicably coupling base station 820 to a network (e.g., the Internet). In another example, communications interface 830 can include a Wi-Fi transceiver for communicating via a wireless communications network. In yet another example, communications interface 830 may include cellular or mobile phone communications transceivers. In some implementations, communications interface 830 is configured to act as a local wireless network for base station 820, e.g., such that remote devices (e.g., remote device 802) can wireless connect to base station 820. For example, communications interface 830 may be configured to act as a Wi-Fi hotspot to allow remote device 802 to be selectively wirelessly connected to 820. In some implementations, communications interface 830 may include a short-range wireless transceiver (e.g., a Bluetooth® transceiver) such that remote device 802 and other devices can connect directly to base station 820 via a wireless connection.

Base station 820 can also include an input/output (I/O) interface 832 to support wired connections to UAVs 840, 852, 854. Specifically, I/O interface 832 may transmit data to, and/or receive data from, any of UAVs 840, 852, 854 via one of cables 120-126. I/O interface 832 may also facilitate the transfer of DC power to UAVs 840, 852, 854 from a power source 834. For example, I/O interface 832 may route DC power to UAVs 840, 852, 854 from power source 834. Accordingly, I/O interface 832 may include any suitable wired interfaces (e.g., jacks, connectors, etc.) for interfacing with cables 120-126 (e.g., connector 404 of cable 400). In some implementations, communications interface 830 may facilitate redundant communications with UAVs 840, 852, 854, e.g., via wireless connections. For example, UAVs 840, 852, 854 may communicate with base station 820 via communications interface 830, as opposed to I/O interface 832 in the event that a power-and-data cable (e.g., cables 120-126) to one of the UAVs is disconnected, as in FIGS. 5A-5E.

Power source 834 can include a connection to an external power supply (e.g., a battery, a wall outlet, etc.) and/or an onboard power supply. For example, in some implementations, power source 834 includes a connection to an external power supply and corresponding circuitry for converting power from the external supply to usable power for UAVs 840, 852, 854. In some such implementations, power source 834 may include a transformer, AC-DC converter, or other suitable circuitry. In other implementations, power source 834 includes only an onboard power supply, such as a battery bank or supercapacitor. In some implementations, power source 834 includes both a connection to an external power supply (e.g., and corresponding circuitry) and an onboard power supply, to act as a backup in the event that power from the external supply is lost.

Memory 824 is shown to include a UAV manager 826 that controls operations of UAVs 840, 852, 854. In this regard, base station 820 may be considered a "controller" of UAVs 840, 852, 854. In some implementations, UAV manager 826 receives configuration data and/or user inputs from remote device 802 (or via user interface 828), which it uses to generate commands for operating UAVs 840, 852, 854. For example, responsive to receiving configuration data (e.g., a desired arrangement of UAVs in an area), UAV manager 826 may determine a current configuration of UAVs 840, 852, 854 and may command one or more of UAVs 840, 852, 854 to activate, maneuver, etc., to achieve a commanded configuration. In some such implementations, "commanding" UAVs 840, 852, 854 may include selectively activating one or more of the UAVs according to their arrangement in a stack on base station 820 and then causing the UAVs to maneuver from base station 820 to an aerial position in an area. Additional features of memory 824 may be realized in conjunction with the description of FIG. 10, below.

It should be appreciated that each of UAVs 840, 852, and 854 can generally include similar components. Therefore, only UAV 840 is described in detail herein (for brevity) but those in the art will understand that the following description of the components of processor 842 also applies to any of the UAVs in aerial lighting system 800. UAV 840 is shown to include a processor 842 and memory 844. Processor 842 can be a general-purpose processor, an ASIC, one or more FPGAs, a group of processing components (e.g., a CPU), or other suitable electronic processing structures. In some implementations, processor 842 is configured to execute program code stored on memory 844 to cause UAV 840 to perform one or more operations, as described below in greater detail. While shown as individual components, it will be appreciated that processor 842 and/or memory 844 can be implemented using a variety of different types and quantities of processors and memory. For example, processor 842 may represent a single processing device or multiple processing devices. Similarly, memory 844 may represent a single memory device or multiple memory devices.

Memory 844 can include one or more devices (e.g., memory units, memory devices, storage devices, etc.) for storing data and/or computer code for completing and/or facilitating the various processes described in the present disclosure. In some implementations, memory 844 includes tangible (e.g., non-transitory), computer-readable media that stores code or instructions executable by processor 842. Tangible, computer-readable media refers to any physical media that is capable of providing data that causes UAV 840 to operate in a particular fashion. Example tangible, computer-readable media may include, but is not limited to, volatile media, non-volatile media, removable media and non-removable media implemented in any method or technology for storage of information such as computer readable instructions, data structures, program modules or other data. Accordingly, memory 844 can include RAM, ROM, EPROM, EEPROM, hard drive storage, temporary storage, non-volatile memory, flash memory, optical memory, or any other suitable memory for storing software objects and/or computer instructions. Memory 844 can include database components, object code components, script components, or any other type of information structure for supporting the various activities and information structures described in the present disclosure. Memory 844 can be communicably connected to processor 842, such as via a processing circuit (not shown), and can include computer code for executing (e.g., by processor 842) one or more processes described herein.

UAV 840 is also shown to include sensors 846 which can generally include an array of different types of sensors for navigation, object detection, etc. Sensors 846 can include, for example, a camera or cameras, IR sensors, a LIDAR transceiver, a GPS transceiver, proximity sensors, and the like. It should be appreciated that the present disclosure is not intended to be limiting in this regard. Those in the art will appreciate that UAVs can generally include a whole host of different sensors and sensing modalities. In some implementations, sensors 846 can include a receiver for detecting beacon emitted by base station 820 (e.g., via communications interface 830). For example, processor 842 can execute instructions stored on memory 844 to analyze the beacon signal and the sensory data collected by sensors 846 to determine a location and orientation of the beacon relative to UAV 840.

In some implementations, UAVs 840 can use artificial intelligence (e.g., executed via processor 842 and memory 844) to optimize deployment and positioning, taking into account various factors such as the beacon signal strength, the terrain and weather conditions, and the mission requirements. For example, UAV 840 may be programmed to maintain a certain distance from the beacon—and thereby base station 820—or to position itself in a specific formation relative to the beacon. UAV 840 can also communicate with other UAVs to coordinate their movements and optimize their deployment and positioning. In addition to deploying and positioning, sensors 846 and functions executed by processor 842 and memory 844 allow UAV 840 to recover from being moved out of position, e.g., due to an external force, and can allow UAV 840 return to base station 820 if a critical error is detected. For example, if moved out of position, UAV 840 can calculate a new trajectory back to an original position or to base station 820.

UAV 840 is also shown to include a communications interface 848 that facilitates communications between UAV 840 and any external components or devices, including base station 820 and UAVs 852, 854. Accordingly, communications interface 848 can be or can include a wired or wireless communications interface (e.g., jacks, antennas, transmitters, receivers, transceivers, wire terminals, etc.) for conducting data communications, or a combination of wired and wireless communication interfaces. For example, communications interface 848 can include a Wi-Fi transceiver for communicating via a wireless communications network. In another example, communications interface 848 may include cellular or mobile phone communications transceivers. In some implementations, communications interface 848 includes a connection point (e.g., connection point 430) for attaching connector 404 of cable 400 to UAV 840, e.g., for data and power transfer. In some such implementations, communications interface 848 can additional include one or more different wireless transceivers for back-up wireless communications with base station 820 or other UAVs.

Optionally, UAV 840 can include an emergency power supply 850 to sustain short periods of operation, e.g., in the event that external power from base station 820 is not available. For example, emergency power supply 850 may be able to provide the electronic components of UAV 840—including motors—with energy to operate for an amount of time sufficient to return to base station 820. Emergency power supply 850 may be or include a battery, a supercapacitor, or other suitable energy storage device. For example, emergency power supply 850 may be a lithium-ion battery. In some implementations, emergency power supply 850 may be recharged using the power provided by base station 820 via a power-and-data cable (e.g., cable 400).

Figure 9:
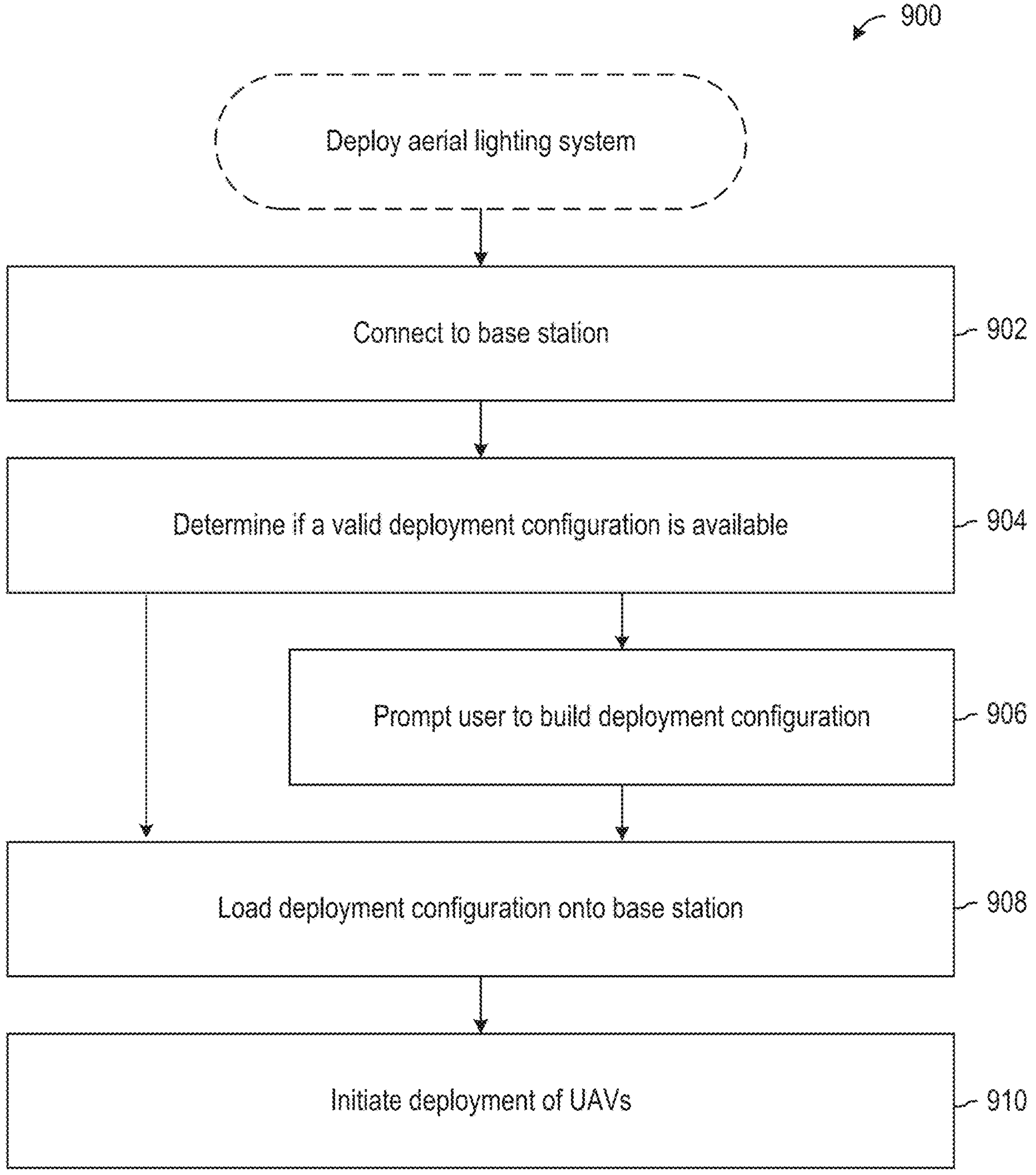
FIG. 9 is a flow chart of a process for activating the aerial lighting system described herein prior to deployment of the UAVs, according to some implementations.

Referring now to FIG. 9, a flow chart of a process 900 for activating the aerial lighting system described herein prior to deployment of the UAVs is shown, according to some implementations. Process 900 may be at least partially implemented by remote device 802, as described above; however, it should be appreciated that the present disclosure is not limiting in this regard. It will be appreciated that certain steps of process 900 may be optional and, in some implementations, process 900 may be implemented using less than all of the steps. It will also be appreciated that the order of steps shown in FIG. 9 is not intended to be limiting.

Initially, process 900 may begin with the deployment of the disclosed aerial lighting system (e.g., aerial lighting system 100, aerial lighting system 800) in an area to be illuminated. Deployment of the aerial lighting system can include transporting the aerial lighting system to the area to be illuminated and setting the base station in a suitable location. In some implementations, deployment can include connecting the base station to a power source (e.g., a wall outlet). Responsive to being connected to a power source, or responsive to being turned on by a user, the base station may perform a start-up sequence and validation, as discussed below with respect to FIG. 10. Once the start-up sequence and validation are complete, or as part of the start-up sequence and validation, the base station may activate a local wireless network or may otherwise wait for a connection from a remote device.

At step 902, a connection is made with the base station, e.g., via a wireless network or another type of wired or wireless connection. A user may then open or start a software application to configure the aerial lighting system for operation. For example, the user may open a mobile application via remote device 802 or may access a web-based application via a web browser on remote device 802. Upon start-up, the application may connect to base station 820 and exchange state and configuration data. At step 904, the state and configuration data received from base station 820 is checked to determine if a valid deployment configuration (e.g., of UAVs 102-108) is available, either on remote device 802 or preloaded onto base station 820. If there is not a valid deployment configuration available, then at step 906, the user may be prompted to build a deployment configuration. For example, an alert may be displayed on remote device 802 indicating that a deployment configuration is not found and prompting the user to create a deployment configuration. Creating a deployment configuration can include confirming (e.g., by a user) an inventory of UAVs in the aerial lighting system and generating a deployment layout for the UAVs, e.g., within an area.

However, if a deployment configuration is available, then at step 908, it may be loaded onto base station 820. For example, the user may select the deployment configuration from a list or, if only one deployment configuration is available, it may be automatically uploaded to base station 820. At step 910, deployment of the UAVs is initiated, causing the UAVs to activate and deploy according to the deployment configuration. In some implementations, this step can include validating the deployment configuration and/or UAV inventory (e.g., by base station 820) and then transmitting commands to UAVs to cause them to activate and maneuver to an operating position.

Figure 10:
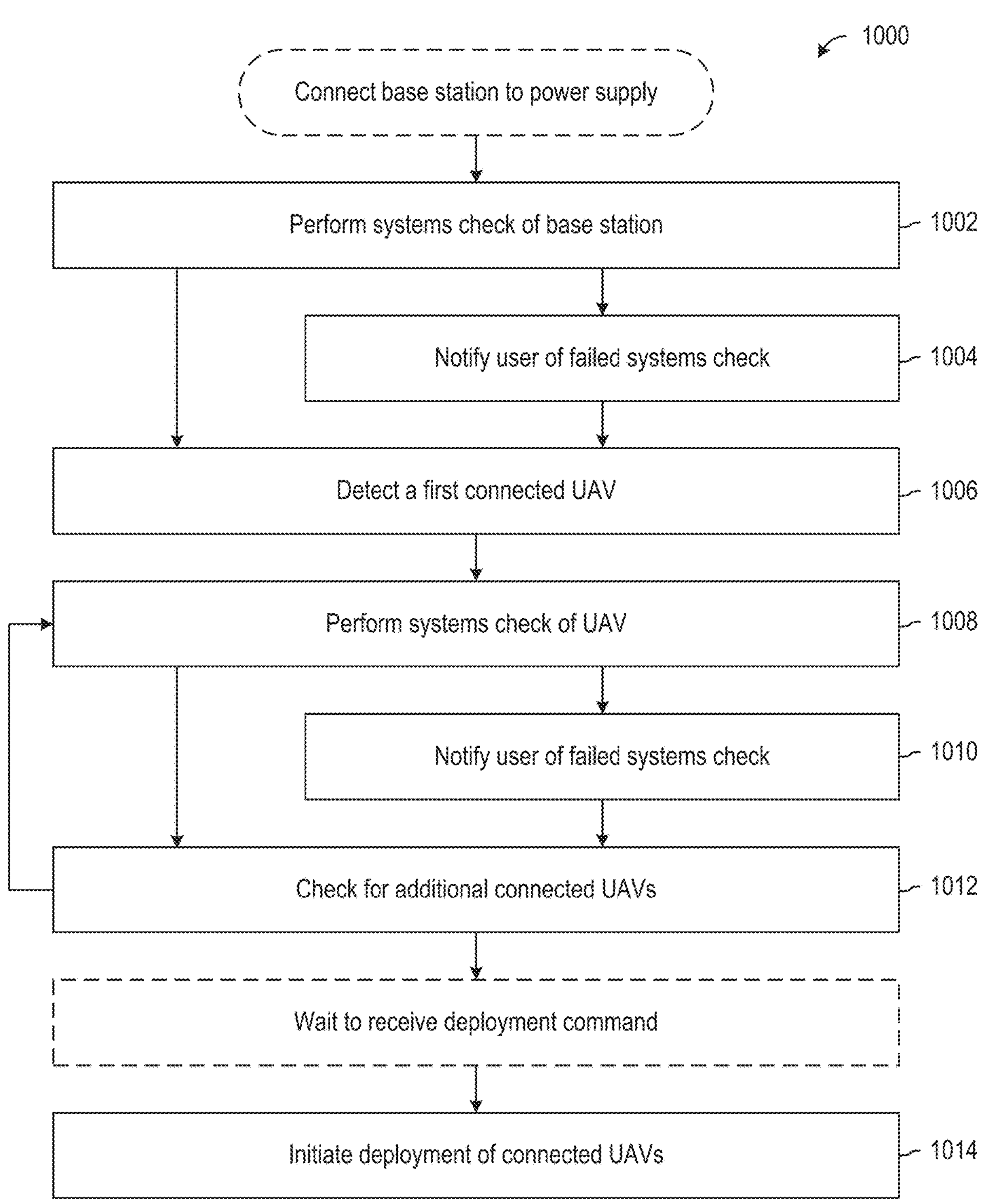
FIG. 10 is a flow chart of a process for configuring the aerial lighting system described herein prior to deployment of the UAVs, according to some implementations.

Referring now to FIG. 10 is a flow chart of a process 1000 for configuring the aerial lighting system described herein prior to deployment of the UAVs is shown, according to some implementations. Process 1000 may be at least partially implemented by base station 820, as described above; however, it should be appreciated that the present disclosure is not limiting in this regard. It will be appreciated that certain steps of process 1000 may be optional and, in some implementations, process 1000 may be implemented using less than all of the steps. It will also be appreciated that the order of steps shown in FIG. 10 is not intended to be limiting.

As discussed above, process 1000 may be performed in conjunction with process 900, e.g., during or after deployment of the aerial lighting system to a location. Accordingly, process 1000 may initially include connecting the base station to a power supply (e.g., a wall outlet) and/or otherwise providing power to the base station or activating the base station. In response to being powered on, at step 1002, the base station performs initial system checks. If any of the systems checks fail, then at step 1004, a user may be notified of the failed system check (e.g., via user interface 810 or user interface 828). Optionally, the notification may provide information about the failure, such as the specific check that was failed or the associated components. In some implementations, the notification can include illuminating one or more LED indicators on the base station (e.g., changing an indicator from yellow to red) and/or the notification includes an alert displayed on remote device 802.

If, however, the system checks are successful, then at step 1006, base station attempts to detect connected UAVs. For example, the base station may attempt to provide power to a first UAV via a corresponding power-and-data cable. When a first UAV is detected, the base station performs a systems check of the UAV or causes the UAV to perform an internal systems check. The UAV systems check may include running a rotor test sequence, a magnetic cable connection test sequence, and/or an LED test sequence. If any of the UAV systems checks fail, then at step 1010, the user is notified (e.g., via indicator LEDs, via remote device 802, etc.). If the UAV systems checks pass, then at step 1012, the base station checks for additional UAVs (e.g., the next UAV connected to the first UAV) and, if detected, returns to step 1008 where a UAV systems check is performed. Thus, steps 1008-1012 can be repeated until all UAVs connected to the base station are detected and checked.

Once initialization is complete, base station may wait for a deployment command from a user (e.g., via user interface 810 or user interface 828). When the deployment command is received, at step 1014, the deployment of the UAVs is initiated. As mentioned above, this can include sequentially activating the UAVs and causing them to maneuver from a stacked position to a deployment position. Responsive to receiving a shutdown command, or a low power indication from one of the UAVs, base station may cause the UAVs to perform a recall operation whereby the UAVs begin an automated return flight to the base station. The UAVs then land sequentially onto base station 820, e.g., magnetically attaching into a stack. As mentioned above, electromagnets may provide self-alignment and security during the automated docking process. After the fleet of UAVs lands and (optionally) recharges, the base station may release magnetic locks sequentially, allowing the UAVs to disconnect and prepare for next deployment.

Configuration of Certain Implementations

The construction and arrangement of the systems and methods as shown in the various implementations are illustrative only. Although only a few implementations have been described in detail in this disclosure, many modifications are possible (e.g., variations in sizes, dimensions, structures, shapes, and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the implementations without departing from the scope of the present disclosure.

The present disclosure contemplates methods, systems, and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another implementation includes from the one particular value and/or to the other particular value. Similarly, when values are expressed as approximations, by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal implementation. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific implementation or combination of implementations of the disclosed methods.

What is claimed is:

1. A lighting system comprising:
- two or more unmanned aerial vehicles (UAVs), including: (i) a first UAV having a first high-powered light emitting diode (LED) array, and (ii) a second UAV having a second high-powered LED array;
- a base station that comprises a controller for controlling the first UAV and the second UAV; and
- a plurality of magnetically coupled cables for transferring power and data, including: (i) a first cable detachably coupled between the base station and the first UAV, and (ii) a second cable detachably coupled between the first UAV and the second UAV,
- wherein the two or more UAVs are configured to detect a detachment of one of the plurality of magnetically coupled cables when the two or more UAVs are airborne, and
- wherein one of the first UAV and second UAV detects the detachment performs a self-healing operation to reconnect the detached cable.

2. The lighting system of claim 1, further comprising a first onboard power supply disposed within the first UAV and a second onboard power supply disposed within the second UAV.

3. The lighting system of claim 2, wherein the first onboard power supply and the second onboard power supply comprise a battery.

4. The lighting system of claim 2, wherein the one of the first UAV and second UAV that detects a detachment switches to its onboard power supply and maneuvers to a free end of the detached one of the plurality of magnetically coupled cables.

5. The lighting system of claim 4, wherein the one of the first UAV and second UAV that detects the detachment determines a position of the free end of the detached one of the plurality of magnetically coupled cables based on data from an onboard sensor array or based on wireless communications with another of the first UAV and second UAV, or based on wireless communications with the base station.

6. The lighting system of claim 4, wherein the one of the first UAV and second UAV that detects the detachment maneuvers within a threshold distance of the free end of the detached one of the plurality of magnetically coupled cables and activates an electromagnet to reconnect the free end of the detached one of the plurality of magnetically coupled cables.

7. The lighting system of claim 4, wherein the one of the first UAV and second UAV that detects the detachment maneuvers back to a starting point after reconnecting the detached one of the plurality of magnetically coupled cables.

8. The lighting system of claim 1, wherein the base station comprises a user interface for indicating information associated with the two or more UAVs, wherein the user interface is communicably coupled to the controller.

9. The lighting system of claim 1, wherein the controller comprises a wireless interface for wirelessly communicating with a remote computing device, and wherein the controller is configured to receive configuration data and commands from the remote computing device for controlling the two or more UAVs.

10. The lighting system of claim 1, wherein the first UAV receives power from the base station and communicates with the controller via the first cable and the second UAV receives power from the base station and communicates with the controller via the second cable.

11. A method for performing a self-healing operation in a mastless lighting system comprising a first unmanned aerial vehicle (UAV) having a first high-powered light emitting diode (LED) array and a second UAV having a second high-powered LED array; a base station that comprises a controller for controlling the first UAV and the second UAV; and a first magnetically coupled cable between the base station and the first UAV and a second magnetically coupled cable between the first UAV and the second UAV, the method comprising:
- detecting, by one of the first UAV and second UAV, that one of the first magnetically coupled cable or the second magnetically coupled cable is detached; and
- performing a self-healing operation to reconnect the detached cable by the one of the first UAV and second UAV.

12. The method of claim 11, further comprising:

switching, by the one of the first UAV and second UAV that detects the detachment, to an onboard power supply; and maneuvering to a free end of the detached one of the first magnetically coupled cable or the second magnetically coupled cable that is detached.

13. The method of claim 12, further comprising maneuvering to the free end of the detached one of the first magnetically coupled cable or the second magnetically coupled cable that is detached in accordance with a known length of the one of the first magnetically coupled cable or the second magnetically coupled cable.

14. The method of claim 12, further comprising determining, by the one of the first UAV and second UAV that detects the detachment, a position of the free end of the one of the first magnetically coupled cable or the second magnetically coupled cable that is detached based on data from an onboard sensor array or based on wireless communications with another of the first UAV and second UAV, or based on wireless communications with the base station.

15. The method of claim 12, further comprising:

maneuvering, by the one of the first UAV and second UAV that detects the detachment, within a threshold distance of the free end of the one of the first magnetically coupled cable or the second magnetically coupled cable that is detached; and activating an electromagnet to reconnect the free end of the one of the first magnetically coupled cable or the second magnetically coupled cable that is detached.

16. The method of claim 12, further comprising:

maneuvering, by the one of the first UAV and second UAV that detects the detachment, back to a starting point after reconnecting the one of the first magnetically coupled cable or the second magnetically coupled cable that was detached.

17. The method of claim 11, further comprising communicating by the one of the first UAV and second UAV with the base station to determine a location of another UAV to which the one of the first UAV and second UAV is to reconnect.

18. The method of claim 11, further comprising using a beacon emitted by the base station to perform the self-healing operation.

19. A method for performing a self-healing operation in a mastless lighting system comprising a first unmanned aerial vehicle (UAV) having a first high-powered light emitting diode (LED) array and a second UAV having a second high-powered LED array; a base station that comprises a controller for controlling the first UAV and the second UAV; and a first magnetically coupled cable between the base station and the first UAV and a second magnetically coupled cable between the first UAV and the second UAV, the method comprising:

detecting, by one of the first UAV and second UAV, that an object is exerting a force on one of the first magnetically coupled cable or the second magnetically coupled cable; and releasing from the one of the first magnetically coupled cable or the second magnetically coupled cable experiencing the force by deactivating an electromagnet that couples the first magnetically coupled cable or the second magnetically coupled cable to the first UAV or second UAV;

performing a self-healing operation to reconnect with another UAV in the mastless lighting system.

* * * * *